(12) United States Patent
Guo et al.

(10) Patent No.: US 8,359,156 B2
(45) Date of Patent: Jan. 22, 2013

(54) MAP GENERATION SYSTEM AND MAP GENERATION METHOD BY USING GPS TRACKS

(75) Inventors: Tao Guo, Kodaira (JP); Masashi Koga, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 888 days.

(21) Appl. No.: 12/068,296

(22) Filed: Feb. 5, 2008

(65) Prior Publication Data

US 2008/0262721 A1 Oct. 23, 2008

(30) Foreign Application Priority Data

Apr. 17, 2007 (JP) .................. 2007-108419

(51) Int. Cl.
G06F 19/00 (2006.01)
(52) U.S. Cl. ...................................... 701/411
(58) Field of Classification Search .............. 701/41, 701/213, 400, 411; 340/435, 988
See application file for complete search history.

(56) References Cited

U.S. PATENT DOCUMENTS

| | | | | |
|---|---|---|---|---|
| 5,923,270 | A * | 7/1999 | Sampo et al. | 340/988 |
| 7,805,442 | B1 * | 9/2010 | Joshi et al. | 707/736 |
| 2002/0004701 | A1 | 1/2002 | Nakano | |
| 2006/0030987 | A1 * | 2/2006 | Akita | 701/41 |
| 2006/0293850 | A1 * | 12/2006 | Ahn et al. | 701/213 |
| 2007/0013495 | A1 * | 1/2007 | Suzuki et al. | 340/435 |
| 2007/0021913 | A1 * | 1/2007 | Heiniger et al. | 701/213 |

FOREIGN PATENT DOCUMENTS

| | | |
|---|---|---|
| CN | 1300032 A | 1/2001 |
| CN | 1391005 A | 12/2001 |
| JP | 11-167343 | 6/1999 |
| JP | 2002-116689 | 7/2001 |
| JP | 2002-318533 | 10/2002 |

OTHER PUBLICATIONS

U.S. Appl. No. 11/822,629, filed Jul. 9, 2007, Guo et al.
"Enhanced Digital Mapping Project Final Report", IVI Light Vehicle Enabling Research Program, 2004, pp. i-xxvi and 1-1 to 1-16, 2-1 to 2-68, 3-1 to 3-47, 4-1 to 4-15 and 5-1 to 5-7.

(Continued)

Primary Examiner — John Q Nguyen
Assistant Examiner — Rodney P King
(74) Attorney, Agent, or Firm — Stites & Harbison, PLLC; Juan Carlos A. Marquez, Esq; Nicholas B. Trenkle

(57) ABSTRACT

A map generation system comprising: a mobile device for acquiring location data of a vehicle and a status of the vehicle at a time of acquisition of the location; and a server for processing the acquired location data of the vehicle. The server comprises an input interface, a first storage unit, a processor and a second storage unit. The server includes a management unit for collecting a plurality of pieces of the track data obtained by a motion of the vehicle, an extraction unit for extracting feature points of the plurality of pieces of the track data on a road from which the plurality of pieces of the track data are collected to calculate a Spline curve satisfying the extracted feature points, and an update unit for adding the calculated Spline curve as a lane central line to the digital road map to update map data.

24 Claims, 23 Drawing Sheets

OTHER PUBLICATIONS

Paul Haskitt, "Map Based Safety applications: From Research to Reality (A Review of the IVI-EDMap Project)", in Proceedings of the 12$^{th}$ World Congress on Intelligent Transport Systems, San Francisco, CA, Nov. 6-10, 2005, 17 pages.

ERTICO NextMAP Website, http://its-europe.org/en/activities/activities/nextmap_website.htm, 3 pages.

Office Action from Chinese Patent Office dated Jul. 24, 2009.

Office Action from the Japanese Patent Office regarding corresponding Japanese Patent Application No. 2007-108419, mailed Sep. 13, 2011, in Japanese.

\* cited by examiner

| OPERATION MODE OF DATA RECORDING UNIT | OPERATION OF COLLECTION SWITCH |
|---|---|
| MANUAL | ON/OFF IS SET BY OPERATOR (INITIAL VALUE IS OFF) |
| AUTOMATED | IF THERE IS SUFFICIENTLY LARGE FREE SPACE, COLLECTION SWITCH IS SET ON |
| EXTERNAL SIGNAL TRIGGERED | SIGNAL TRANSMITTED FROM CENTRAL SERVER SWITCHES ON/OFF |

*FIG. 5*

| MODE | NECESSITY |
|---|---|
| MANUAL | SET ON OR OFF |
| AUTOMATED | SET ON BASED ON RESULT OF ERROR DETERMINATION |

*FIG. 8*

| ELEMENT FOR EXTRACTING ROAD | FEATURE |
|---|---|
| ROAD ID | RELATED TO ROAD ID OF MAP |
| GEOMETRIC FEATURES OF ROAD | ROAD CENTRAL LINE (LINK OF NODES, (X1, Y1)—(X2, Y2)—...—(Xn, Yn)) |
| NUMBER OF LANES | FOR EXAMPLE |
| ID OF LANE | FOR EXAMPLE 001 |
| DIRECTION OF LANE | DOWN OR UP |
| GEOMETRIC FEATURE OF LANE | LANE CENTRAL LINE (LINK OF NODES, (X1, Y1)—(X2, Y2)—...—(Xn, Yn)) |
| CURVATURE OF LANE | RELATED TO THREE NODES |
| WIDTH OF LANE | FOR EXAMPLE, X (METER) |
| ...... | ...... |
| ID OF LANE | FOR EXAMPLE 00N |
| DIRECTION OF LANE | DOWN OR UP |
| GEOMETRIC FEATURE OF LANE | LANE CENTRAL LINE (LINK OF NODES, (X1, Y1)—(X2, Y2)—...—(Xn, Yn)) |
| CURVATURE OF LANE | RELATED TO THREE NODES |
| WIDTH OF LANE | FOR EXAMPLE, X (METER) |
| ROAD RELATED INFORMATION | OAD ATTRIBUTE RELATED INFORMATION (CHAIN OF NODES) |
| OTHER ROAD FEATURES | SPECIFIC NECESSARY CONDITIONS |

*FIG. 11*

GPS DATA

2D GAUSSIAN DISTRIBUTION

| TECHNOLOGY | METHOD | DATA COLLECTION | DATA RANGE | DATA PROCESSING | ACCURACY | DATA UPDATE CYCLE | AUTOMATY | COST | POTENTIAL |
|---|---|---|---|---|---|---|---|---|---|
| GROUND-BASED SURVEY | MANUAL SURVEY | DIFFICULT | REGIONAL | EASY | HIGH | EXTREMELY LONG | LOW | EXTREMELY HIGH | LOW |
| MOBILE MAPPING | PROBE-CAR SURVEY | SIMPLE | REGIONAL | DIFFICULT | HIGH | LONG | LOW | HIGH | HIGH |
| PHOTO-GRAMMETRY | REMOTE SENSING | SIMPLE | BROAD | DIFFICULT | MIDDLE | MIDDLE | MIDDLE | MIDDLE | MIDDLE |
| THIS INVENTION | GPS TRACK | MIDDLE | BROAD | MIDDLE | HIGH | DYNAMIC | HIGH | AVERAGE | HIGH |

*FIG. 20*

- FOR ALL REFERENCE POSITIONS — S2501
    - CALCULATE REFERENCE POSITION NEIGHBORING POINT
    - CALCULATE DIFFERENCE VECTOR BETWEEN REFERENCE — S2502
      POSITION AND REFERENCE POSITION NEIGHBORING POINT

- FOR ALL POINTS (Xi, Yi) ON LANE CENTRAL LINE
    - OBTAIN TWO CLOSEST REFERENCE POSITION — S2503
      NEIGHBORING POINTS (Xsi1, Ysi1) AND (Xsi2, Ysi2)
    - OBTAIN CORRECTION VECTOR (Xv, Yv) BY — S2504
      USING THE FOLLOWING EXPRESSIONS $Xv = (Xv1*(Xsi2 - Xi) + Xv2*(Xi - Xsi1))/(Xsi2 - Xsi1)$ $Yv = (Yv1*(Ysi2 - Yi) + Yv2*(Yi - Ysi1))/(Ysi2 - Ysi1)$

DIFFERENCE VECTOR OF (Xsi1, Ysi1)
      DIFFERENCE VECTOR OF (Xsi2, Ysi2) — S2505
    - CORRECT (Xi, Yi) TO BE (Xi+Xv, Yi+Yv) BASED ON CORRECTION VECTOR

*FIG. 22*

MAP GENERATION SYSTEM AND MAP GENERATION METHOD BY USING GPS TRACKS

CLAIM OF PRIORITY

The present application claims priority from Japanese patent application JP 2007-108419 filed on Apr. 17, 2007, the content of which is hereby incorporated by reference into this application.

BACKGROUND OF THE INVENTION

This invention relates to a method of generating a digital road map, in particular, a technology of mapping a lane central line onto a road map by utilizing a driving trajectory of a vehicle.

The integration of a digital road map and a precise positioning system is extremely significant for an advanced driving safety application which draws increasing attention as, for example, a next-generation vehicle navigation system. However, current digital road maps hardly satisfy the requirements of a driving safety application in terms of accuracy and information content. Therefore, there are increasing needs of mapping roads onto a map at high accuracy and in a detailed manner.

Conventional road mapping technologies are based on data measured by survey methods which can be roughly classified into two categories: a ground-based survey and an air survey. A ground-based survey system includes in-vehicle equipment (including a GPS receiver). Devices such as a camera (which may be replaced by a laser scanner), a display device, and a communication device may be connected to the in-vehicle equipment. Such a system acquires detailed information on a road on which a system-carrying vehicle travels. However, the application range of the system is limited because of problems such as the limited applicability of the system only to an extremely small range of survey, a long cycle required to collect data, complicated data processing after the survey, and a high cost for system maintenance.

On the other hand, the air survey appears to be a promising solution for its large coverage area and quick data collection. However, efficient extraction of necessary information from complicated data suffers great technical difficulties. Moreover, the generation of a highly accurate road map based on the conventional survey data requires resources and time.

FIG. 23 illustrates a process performed by a vehicle navigation system which uses an in-vehicle GPS device and a digital road map database. The vehicle navigation system determines the location of a vehicle on a map. This process is referred to as map matching. Location information of the vehicle is determined based on a signal captured by the in-vehicle GPS device. As illustrated in FIG. 24, when a GPS positioning signal is available, the location information acquired by the GPS device is checked against a digital map to enable the use of the vehicle navigation. However, since the GPS signal is a radio wave coming from a GPS satellite, the GPS signal is unavailable in some cases. In the urban areas, in particular, positioning using the GPS cannot be used at a location where radio waves coming from a predetermined number of satellites cannot be received due to sky occlusion. Therefore, various complementary methods such as positioning using a ground wave, a pseudo GPS satellite system, and a radio identification tag have been developed as methods of determining a precise location of the vehicle.

For the current digital road map, the relative precision of a link of nodes provided on a road is regarded as more important than the accuracy of road geometric information for its navigation use. For example, as illustrated in FIG. 25, a link AB allows a driver to know that a vehicle gets to a point B after passing through a point A. This route guidance function is called navigation. For a navigation application, whether or not the link AB precisely indicates a road between the point A and the point B is not always important. For the vehicle navigation, a simplified road map functions effectively. For a driving safety application in which a vehicle is required to be guided precisely onto a lane, however, whether the link AB on the road map is a straight line AB or a curve ACB makes a significant difference.

An advanced driving safety assistance system is one of the most promising technologies in the development of the next-generation vehicle navigation system. For example, the early researches such as the U.S. Department of Transportation project, Enhanced Digital Mapping (EDmap) as described in Non-Patent Document 1 and Non-Patent Document 2 and the European Union counterpart, NextMap, as described in Non-Patent Document 3 indicate that the integration of an enhanced digital road map and a precise positioning system is extremely important for the driving safety application. In the systems described above, applications using a map or enhanced applications such as Curve Speed Assistant-Warning and Control (CSA-W and CSA-C) have been subjected to a verification test. The applications match a vehicle position with a map to predict the curvature of a road ahead to electronically visualize a road that the vehicle is approaching. The DaimlerChrysler AG (currently, Daimler AG) proposes another application for Lane Following assistant-Warning (LFA-W). The application combines a vision lane tracker system, a lane-level digital map, and a highly accurate positioning system to warn a driver when a vehicle is about to leave the lane.

Corresponding to the positioning accuracy of the in-vehicle GPS device in the present days, the current digital navigation road map provides location information of a road only at the level of granularity with an emphasis on topological correctness of road-node links. Since the vehicle navigation system uses the matching of the location information of the vehicle to the map, the vehicle navigation system is less sensitive to the accuracy and the contents of the road map. On the other hand, the driving safety application requires extremely precise road geometric information, for example, a road central line, a lane central line, a road curvature and the like, and in addition, the detailed contents, for example, the number of lanes, a stopping location, and a speed limit. The generation of the enhanced digital road map required for the driving safety application by a conventional method needs a high cost. The ground-based survey is laborious, whereas the air survey suffers a problem of technical difficulties in information extraction. The probe car survey provides a method of acquiring detailed information of the road. However, the application of the survey with the probe car is limited to a large-scale survey because a high cost is required. Consequently, in order to satisfy a variety of demands for the enhanced digital road map, it is important to provide a cost-effective method.

Further, the current digital road maps scarcely satisfy the requirements of the driving safety application in view of the accuracy and the contents of information. Moreover, conventional road map generation technologies are resource-and time-consuming. In regard to the problems described above, this invention provides an appropriately cost-effective method of generating a highly accurate road map.

For example, as illustrated in FIG. 23, it should be noted that the result of matching of GPS location information to a map for the vehicle navigation has been simply abandoned. The result of matching of an acquisition sequence of the GPS location information acquired by the in-vehicle GPS device and the corresponding map (the result is referred to as GPS track) contains a trajectory of a vehicle motion, which provides perfect matching with road geometric information. The GPS track data is not sufficient to represent precise road information because of an error deviation of a GPS positioning signal. However, the collection and the accumulation of a large number of pieces of the GPS track data as described above allow road information to be statistically derived from the GPS tracks. This invention provides a method of collecting and accumulating such GPS track data which has been conventionally abandoned.

An object of this invention is to provide a novel method of statistically analyzing data obtained from an in-vehicle GPS device to dynamically generate a highly accurate road map. The basic idea of this invention comes from a technical concept called "data recycling". According to the concept of "data recycling", a large number of pieces of track data obtained by the in-vehicle GPS device are collected because the track data obtained by the in-vehicle GPS device contains road-specific information. Further, this invention provides a map generation method at a lower cost than that required by a conventional method.

SUMMARY OF THE INVENTION

A representative aspect of this invention is as follows. That is, there is provided a method of generating a digital road map, including: a first step of collecting a plurality of pieces of track data obtained by a movement of a vehicle; a second step of extracting feature points of the plurality of pieces of track data for a road from which the plurality of pieces of track data are collected to calculate a Spline curve satisfying the extracted feature points; and a third step of adding the calculated Spline curve as a lane central line to the digital road map to update map data.

According to an aspect of this invention, a highly accurate road map can be generated at a low cost.

BRIEF DESCRIPTION OF THE DRAWINGS

The present invention can be appreciated by the description which follows in conjunction with the following figures, wherein:

FIG. 5 is an explanatory diagram showing operation modes of data recording unit in accordance with the embodiment of this invention;

FIG. 8 is an explanatory diagram showing operation modes of data update in accordance with the embodiment of this invention;

FIGS. 11 and 12 are explanatory diagrams showing configuration of enhanced road map data in accordance with the embodiment of this invention;

FIG. 20 is an explanatory diagram showing the comparison between conventional mapping technologies and the embodiment of this invention;

FIG. 22 is an explanatory diagram showing an example of correction processing of the central line in accordance with the embodiment of this invention.

DETAILED DESCRIPTION OF THE PREFERRED EMBODIMENT

An embodiment of this invention will now be described referring to the accompanying drawings.

Figure 1:
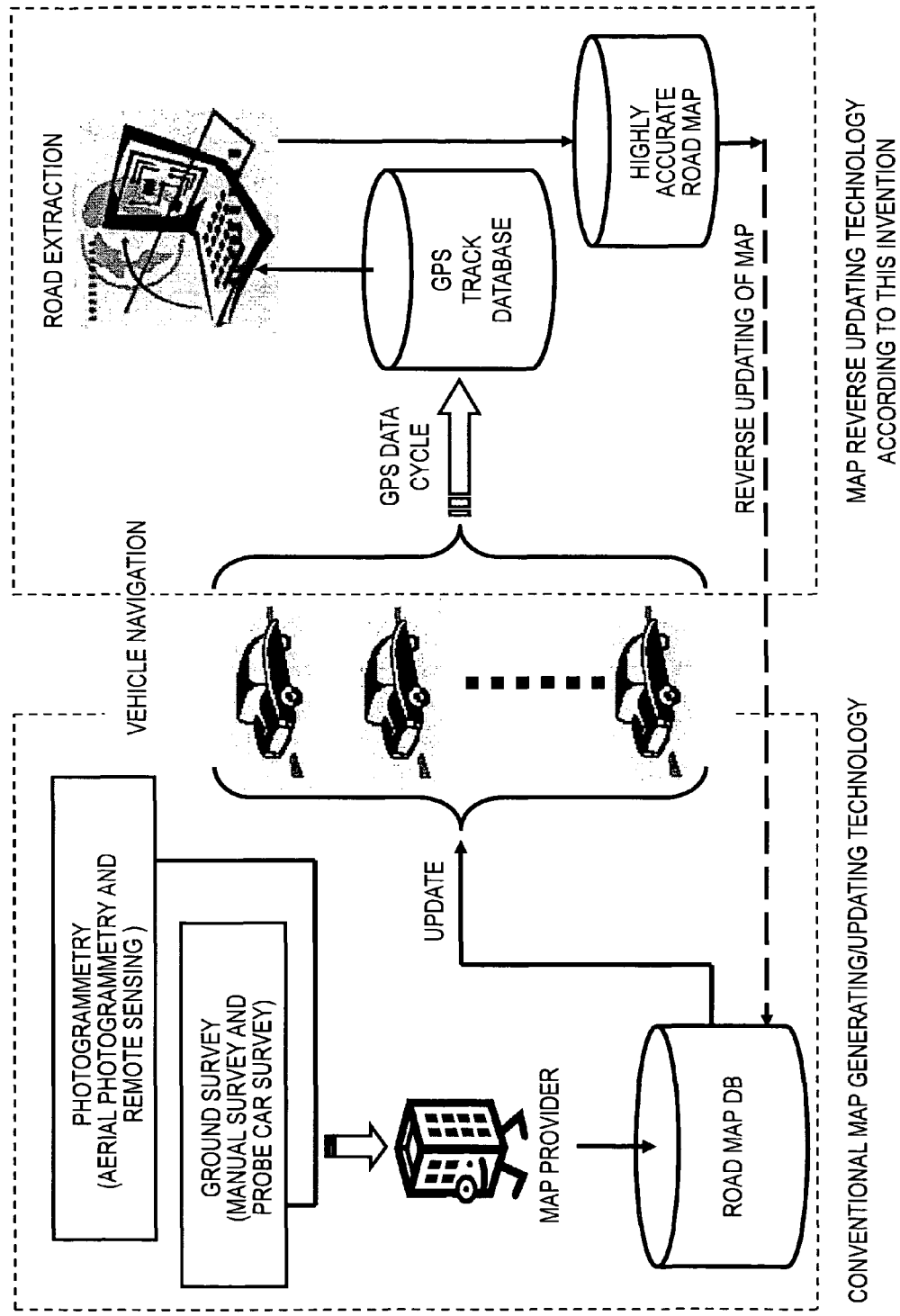
FIG. 1 is an explanatory diagram showing a concept of the embodiment of this invention.

FIG. 1 illustrates a general outline of the embodiment of this invention. A basic concept of this invention will be described referring to FIG. 1.

The left part of FIG. 1 illustrates a conventional method of generating a road map as described above. Basic data used for the road map is obtained by, for example, air survey (photogrammetry and/or remote sensing) and a geographic survey (manual measurement and/or probe car survey) for each surveyed sector. Thereafter, a provider for providing the map (map-maker) uses the obtained basic data to manually or semi-automatically produce a road map. The map-making requires a high cost because a map-making process is extremely laborious and time-consuming as described above.

Map update for replacing old map data with new one has two levels of meaning. One corresponds to an update process between a map provider and a map database owner. Specifically, a central map database is updated with new road data obtained for a newly surveyed sector. The other meaning is the update of replicated data in the central map database, which is owned by each individual user.

Currently, information for updating the map flows uniquely from a provider to a user, and there is no feedback from the user to the provider. Specifically, the map update is a unidirectional process from the provider to the user.

With the introduction of a GPS data recycling system by this invention as illustrated in the right part of FIG. 1, the map data feedback from the user to the provider occurs to complete an information cycling flow in the map update. Specifically, in this invention, pieces of GPS track data collected by a vehicle motion and recorded in the vehicle are used to generate a correct and detailed road map. The GPS track data is used to update the central map database. The above-described updating process involving the data feedback from the user to the provider is referred to as "Reverse Updating".

Figure 2:
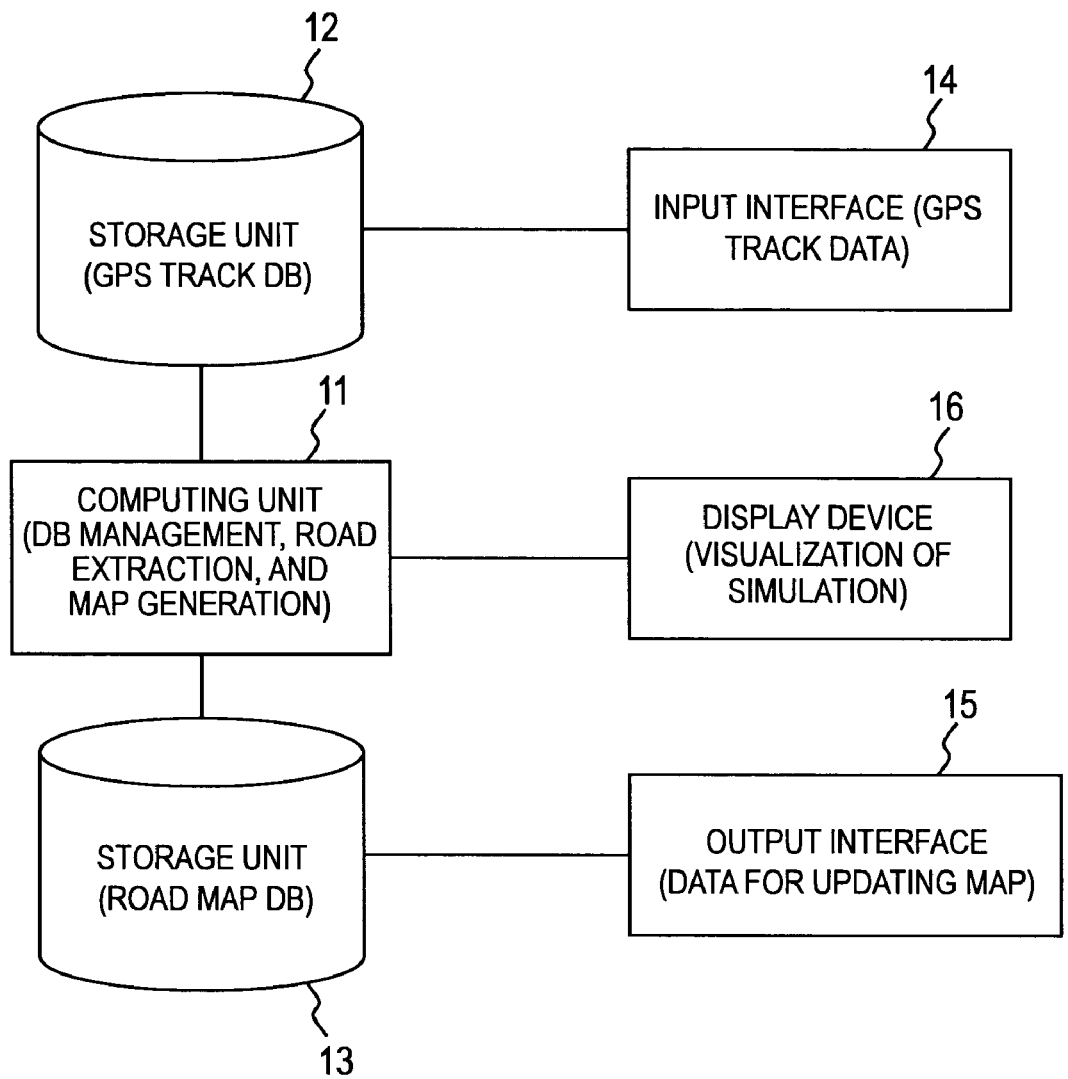
FIG. 2 is a block diagram illustrating an example of hardware configuration of a road map generation system in accordance with the embodiment of this invention.

FIG. 2 is a block diagram illustrating an exemplary configuration of hardware of a road map generation system according to the embodiment of this invention.

The road map generation system according to the embodiment of this invention includes a computing unit 11, storage units 12 and 13, an input interface 14, an output interface 15, and a display device 16.

The computing unit 11 includes a CPU for executing various programs, a ROM for storing programs executed by the CPU, and a RAM used as a work area for the execution of the programs. The CPU executes various programs to manage the data stored in the storage units 12 and 13.

The storage unit 12 holds a GPS track database which stores GPS track data. The storage unit 13 holds a road map database which stores highly accurate digital road map data. Although FIG. 2 illustrates two storage units, the number of storage units is not limited thereto.

The input interface 14 communicates with an in-vehicle device according to a predetermined protocol to receive the GPS track data stored in the in-vehicle device. The output interface 15 outputs data for updating a road map generated by the road map generation system.

The display device 16 displays a profile of the GPS track data or displays for urging a command of an operator in a process executed by the road map generation system.

Figure 3:
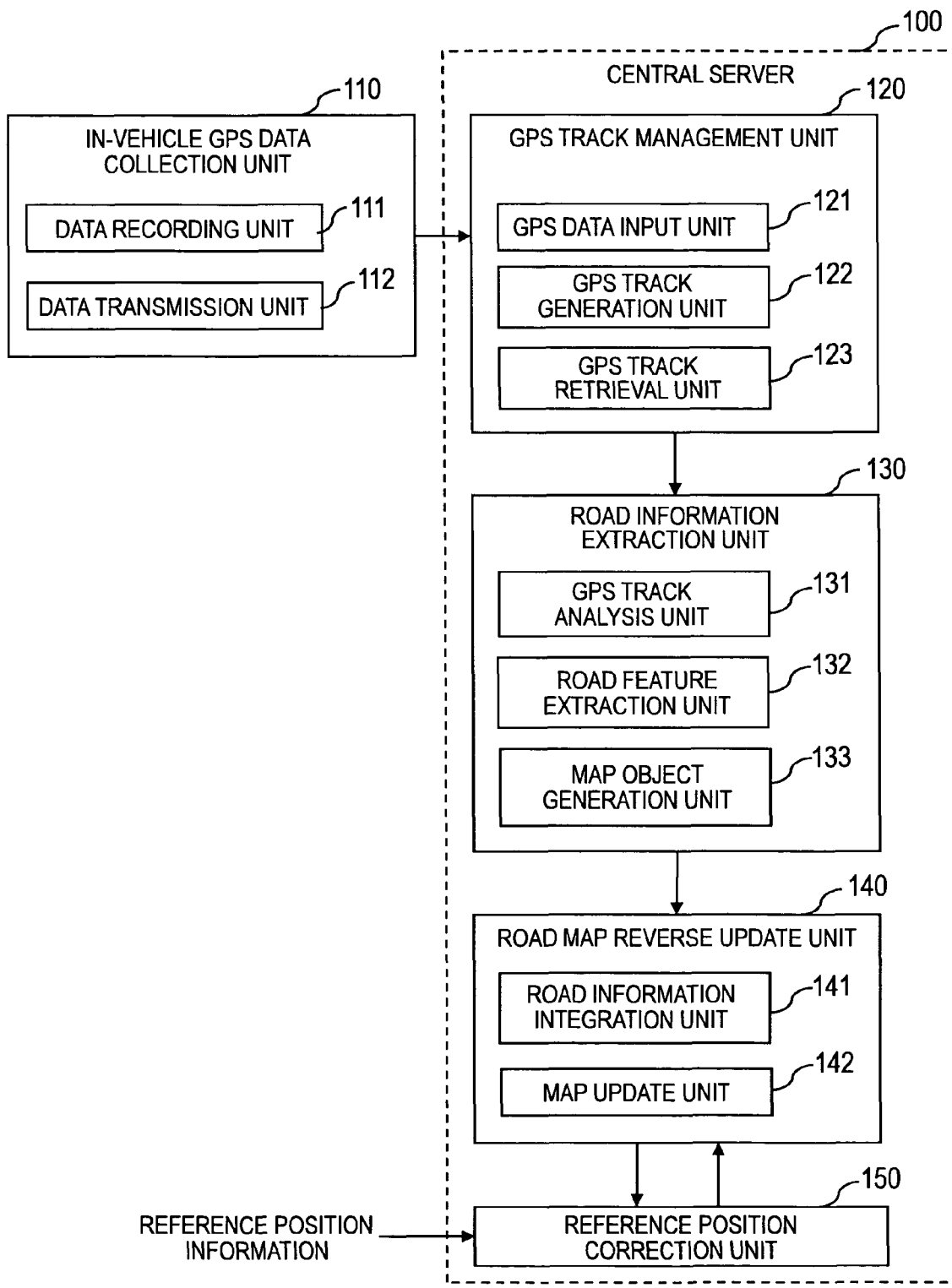
FIG. 3 is a functional block diagram showing an example of configuration of the road map generation system in accordance with the embodiment of this invention.

FIG. 3 is a functional block diagram illustrating an exemplary configuration of the road map generation system according to the embodiment of this invention.

The road map generation system according to this embodiment includes an in-vehicle GPS data collection unit 110 and a central server 100. The central server 100 includes a GPS track management unit 120, a road information extraction unit 130, a road map reverse update unit 140, and a reference position correction unit 150.

The GPS data collection unit 110 includes a data recording unit 111 and a data transmission unit 112. The data recording unit 111 records GPS positioning data measured by the in-vehicle GPS device and parameters associated with the GPS positioning data. The data transmission unit 112 is communicable with a GPS data input unit 121 described below to provide an output interface for transmitting the GPS positioning data collected by the GPS data collection unit 110 to the GPS data input unit 121.

Figure 14:
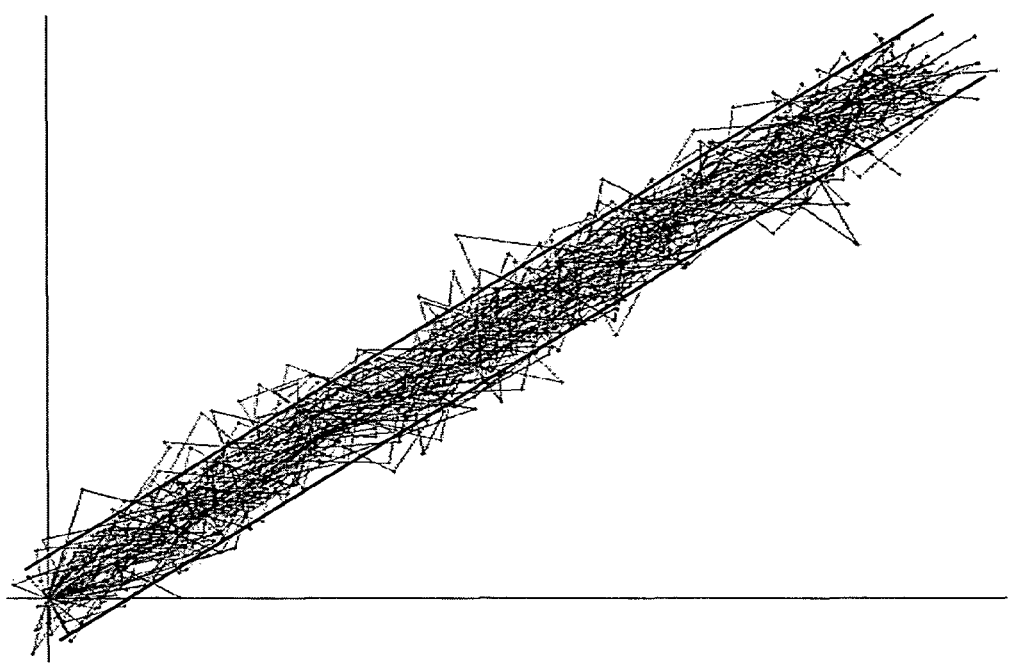
FIGS. 14 and 15 are explanatory diagrams showing an example of the GPS track obtained by the road map generation system in accordance with the embodiment of this invention.

The GPS track management unit 120 includes the GPS data input unit 121, a GPS track generation unit 122, and a GPS track retrieval unit 123. The GPS data input unit 121 communicates with the data transmission unit 112 according to a predetermined protocol to provide an input interface for receiving the data accumulated in the GPS data collection unit 110. The GPS track generation unit 122 generates GPS track data represented by a time and a location. An example of the GPS track data is illustrated in FIG. 14. The GPS track retrieval unit 123 retrieves desired GPS track data by using a road ID and a time as keys.

The road information extraction unit 130 includes a GPS track analysis unit 131, a road feature extraction unit 132, and a map object generation unit 133. The GPS track analysis unit 131 determines whether or not the GPS track data is appropriate for updating the road map. The road feature extraction unit 132 extracts a curve from the GPS track data as a candidate of a lane central line. The map object generation unit 133 generates a map object to be written to the road map data.

The road map reverse update unit 140 includes a road information integration unit 141 and a map update unit 142. The road information integration unit 141 compares an attribute of the generated map object with that of a map object to be updated. The map update unit 142 writes the attribute of the generated map object to the road map database to update the map data.

The reference position correction unit 150 corrects a lane central line, referring to the input highly accurate reference position information. The reference position information is the assembly of information containing information of a plurality of reference positions.

Figure 4:
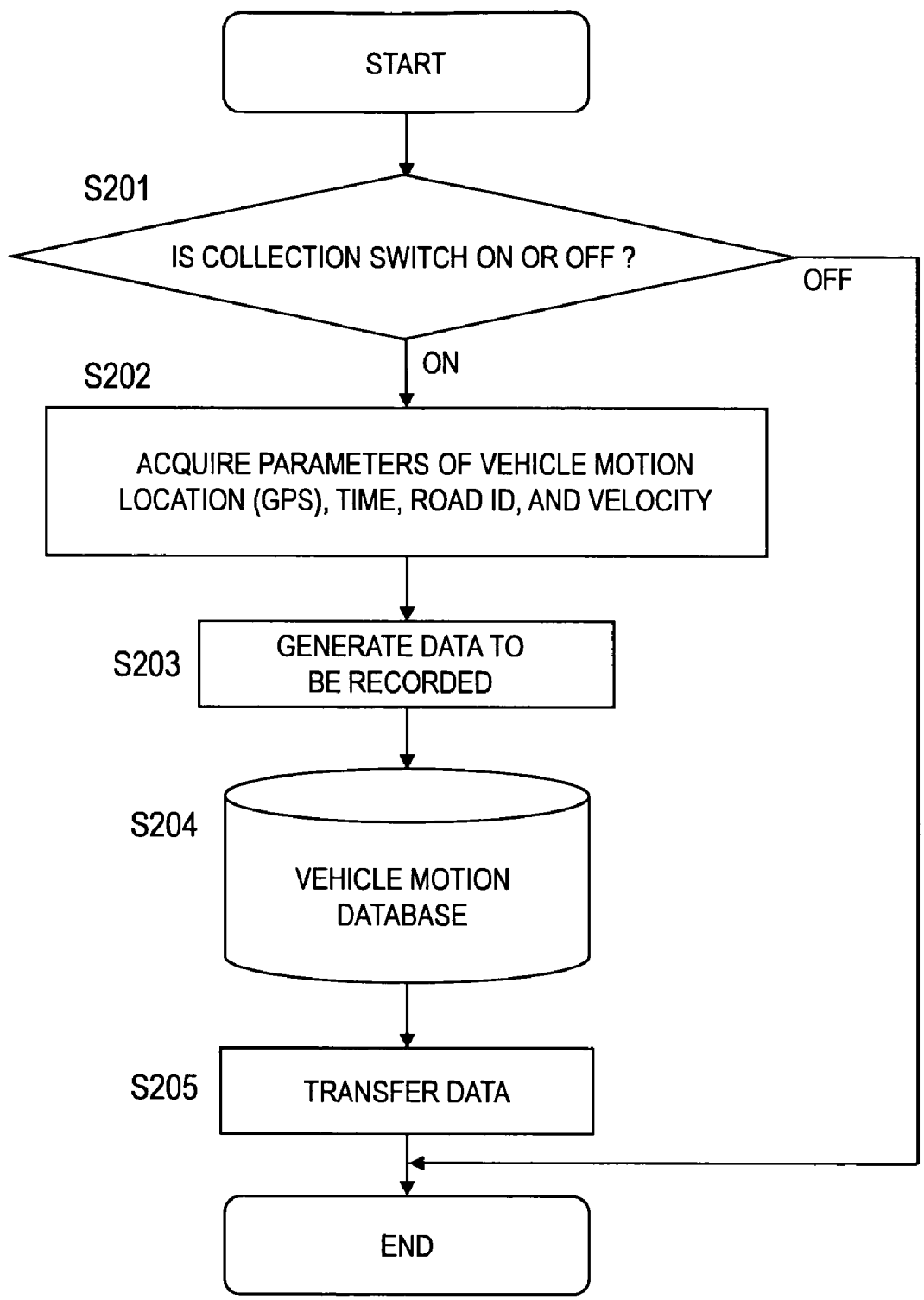
FIG. 4 is a flowchart of a GPS data collection process in accordance with the embodiment of this invention.

FIG. 4 is a flowchart of a GPS data collection process according to the embodiment of this invention. The GPS data collection process is executed by the GPS data collection unit 110.

First, the GPS data collection unit 110 determines whether a collection switch is ON or not (S201). The collection switch is provided for the data recording unit 111. An operation state of the data recording unit 111 is changed by the collection switch to determine whether or not to collect the GPS positioning data.

As illustrated in FIG. 5, three operation modes of a manual mode, an automated mode, and an external signal triggered mode, can be set for the data recording unit 111. An operator operates the GPS data collection unit to set the operation mode of the data recording unit 111 to any one of the manual mode, the automated mode, and the external signal triggered mode to show the agreement/disagreement with the collection of the GPS positioning data.

In the manual mode, ON/OFF of the collection switch is set by the operator. It is recommended that an initial value be OFF. In the automated mode, if the data recording unit 111 has a sufficiently large free space, the collection switch is set ON to collect the GPS positioning data. On the other hand, if a free space in the data recording unit 111 is not sufficient, the collection switch is set OFF to prevent the collection of the GPS positioning data. In the external signal triggered mode, a command signal transmitted from the central server 100 switches ON/OFF of the collection switch.

If the collection switch is determined as being OFF as a result of determination in Step S201, the GPS positioning data of the vehicle is not collected to terminate the GPS data collection process. On the other hand, if the collection switch is determined as being ON, the process proceeds to Step S202 to record the GPS positioning data because the ON state of the collection switch means that the operator agrees with the collection of the GPS positioning data.

In Step S202, parameters collected based on a vehicle motion are acquired. Specifically, the parameter indicates a running status of the vehicle, which includes the location of the vehicle measured by the GPS device, a measurement time of the location, a road identifier (road ID), and a vehicle velocity.

Thereafter, the acquired parameter is associated with a road on the map based on the road ID and is then converted into data to be recorded on a vehicle motion database provided in the data recording unit 111 (S203). Then, the data obtained by the conversion is stored in the vehicle motion database (S204).

Thereafter, the data stored in the vehicle motion database is transferred from the data transmission unit 112 to the central server 100 (S205). The data can be transferred to the central server 100 by copying through a medium or by data transfer through a network.

Figure 6:
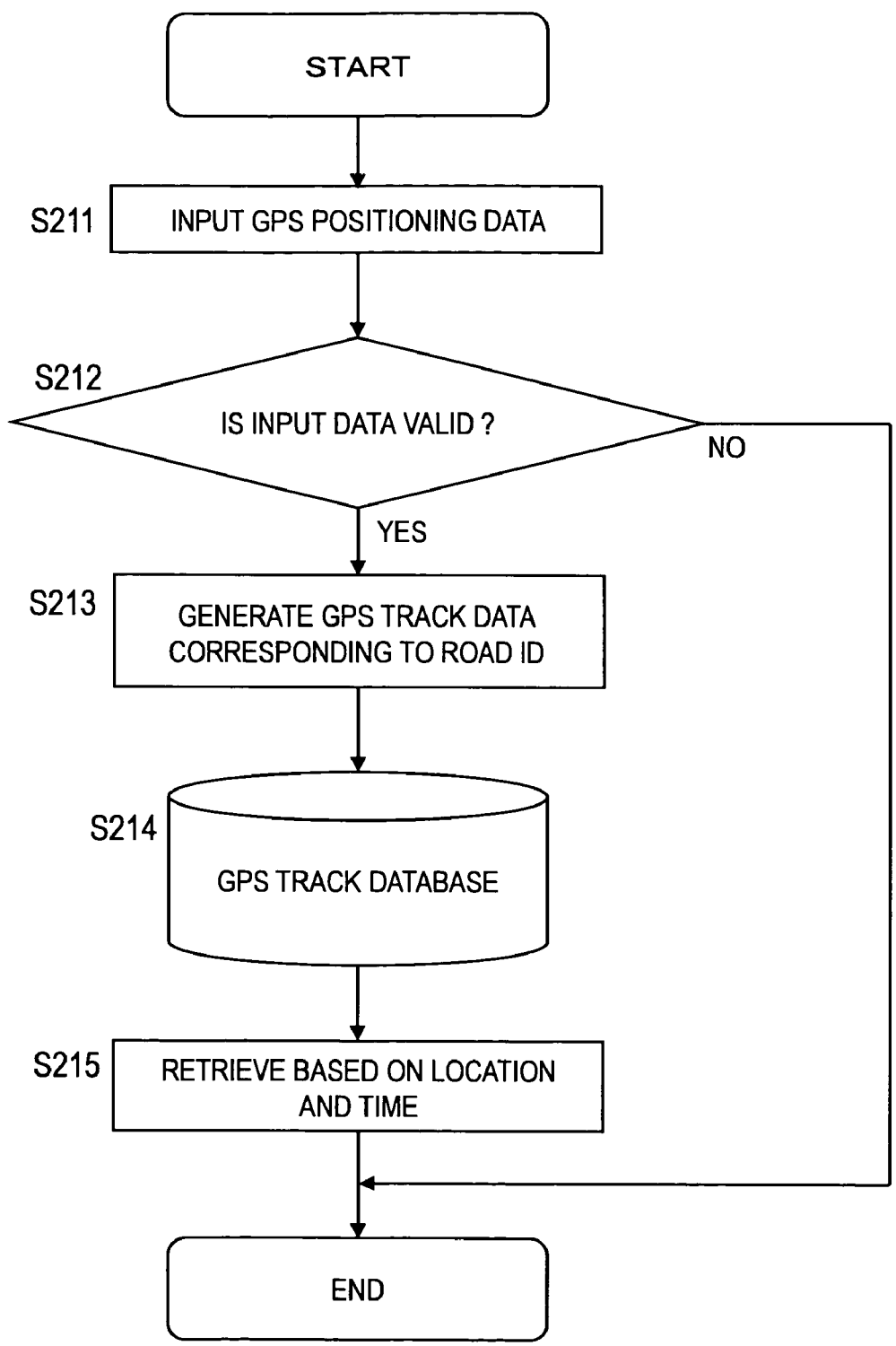
FIG. 6 is a flowchart of a GPS track management process in accordance with the embodiment of this invention.

FIG. 6 is a flowchart of a GPS track management process according to the embodiment of this invention. The GPS track management process is executed by the GPS track management unit 120.

First, the GPS positioning data recorded on the vehicle motion database is input from the GPS data collection unit 110 to the GPS data input unit 121 (S211). Thereafter, the validity of the input data is determined (S212). Specifically, it is determined whether or not the input data is in a correct data format and is usable for map updating.

If the data is not valid, the GPS track management process is terminated. On the other hand, if the data is valid, the process proceeds to Step S213.

The GPS track generation unit 122 specifies the road ID corresponding to the input GPS positioning data and arranges the GPS positioning data in a chronologic order to generate the GPS track data corresponding to the specified road ID (S213). Alternatively, the in-vehicle GPS data collection unit 110 may generate the GPS track data. In this case, the central server 100 receives the generated GPS track data from the in-vehicle GPS data collection unit 110.

Then, the generated GPS track data is stored in the GPS track database provided in the GPS track management unit 120 (S214). At this time, the GPS track is provided with a retrieval index according to the road ID and the order of data acquisition.

Thereafter, the GPS track retrieval unit 123 retrieves required data from the GPS track database to extract the retrieved data (S215). For example, in the data extraction in Step S215, data containing the same location (road ID) and the same data collection time is extracted.

Figure 7:
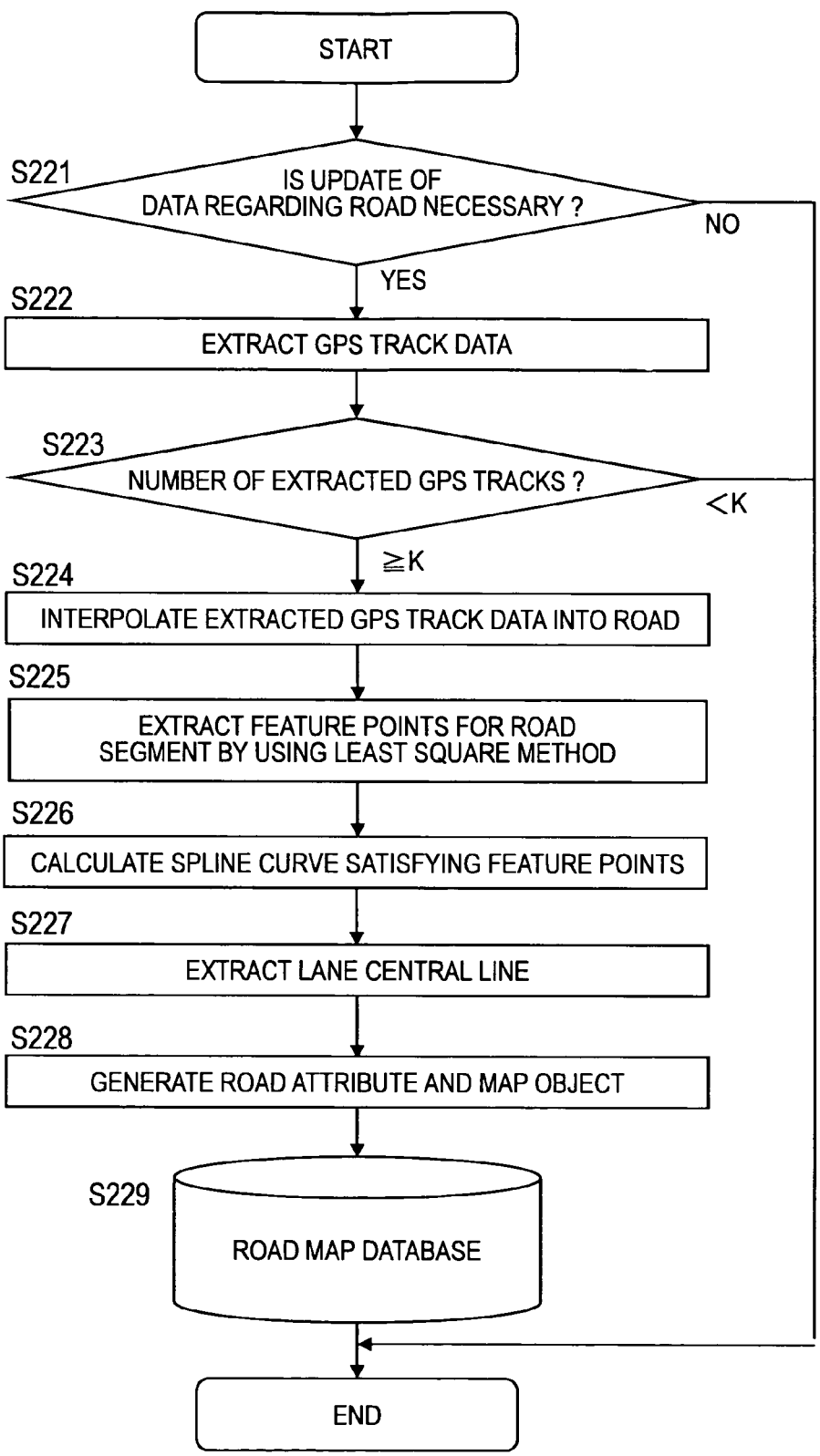
FIG. 7 is a flowchart of a road information extraction process in accordance with the embodiment of this invention.

FIG. 7 is a flowchart of a road information extraction process according to the embodiment of this invention. The road information extraction process is executed by the road information extraction unit 130.

First, the necessity of update of data regarding a target road is determined (S221). The necessity of update is set to be determined in the manual mode or the automated mode, as illustrated in FIG. 8. In the manual mode, the updating necessity is set ON to allow the road map data to be unconditionally updated or OFF to prevent the road map data from being updated.

In the automated mode, the updating necessity is set ON or OFF according to the current accuracy of the road. For example, if an error (for example, a variance) of the current road map data is smaller than or equal to a predetermined threshold value, the data of the road to be updated is converged. Therefore, the road data is not required to be updated. Accordingly, the updating necessity is set OFF. On the other hand, if the error (variance) of the road map data is larger than the predetermined threshold value, the data of the road map to be updated has not been converged yet. Therefore, the road map data is to be updated with new GPS track data. Accordingly, the updating necessity is set ON.

If the data update is not required as a result of determination, the road information extraction process is terminated. On the other hand, if the data update is required, the process proceeds to Step S222.

In Step S222, first, a plurality of transversal lines is drawn at predetermined intervals on the road to be updated to partition the road into a plurality of segments. Each of the segments obtained by the partition is used as a unit for extracting a feature point of the road in Step S225.

Thereafter, GPS track data corresponding to the road required to be updated is extracted. Specifically, the GPS track data having the same road ID as that of the road required to be updated, the same location as that of the segment required to be updated, and the data collection time falling within a predetermined range is extracted. At this time, a lane (up or down, or the like) may be identified by a lane ID.

Thereafter, the number of pieces of the extracted GPS track data is compared with a predetermined value K (S223). If the number of pieces of the extracted GPS track data is smaller than the predetermined value K, the road information extraction process is terminated. On the other hand, if the number of pieces of the extracted GPS track data is equal to or larger than the predetermined value K, the process proceeds to S224. Whether or not to update the road map database is determined based on the result of the comparison between the number of pieces of the extracted GPS track data and the predetermined value because the road map database update is performed on a small scale if the number of pieces of the GPS track data used for the updating is small. Therefore, in such a case, the database is not appropriately updated to improve a data error. Accordingly, the road information extraction process is not executed until a sufficient amount of the GPS track data is accumulated.

Thereafter, the extracted GPS track data is interpolated into each corresponding one of the segments of the road (S224).

Then, feature points of the GPS track data are extracted for each of the partitioned segments of the road by using a least square method (S225). For example, although it is recommended that modes be extracted as the feature points, other statistic values may also be used as the feature points. Then, a curve satisfying the extracted feature points is calculated (S226). Specifically, a Spline curve passing through the extracted feature points is calculated in Step S226. However, if the extracted feature points contain any irregular point, a Spline curve which avoids the irregular point may be calculated. The Spline curve may also be determined by weighting with a variance of each of the segments of the road obtained by the partition.

Thereafter, a lane central line is obtained by using the thus derived Spline curve (S227). Specifically, the lane central line is represented as a numerical value by the derived Spline curve.

Thereafter, attribute data of the road to be updated and a map object (data of a lane center to be added to the map database) are generated (S228). The generated map object and road attributes are written into the road map data to update the road map database (S229). The details of the road map reverse updating process in Step S229 will be described referring to FIG. 9.

Figure 9:
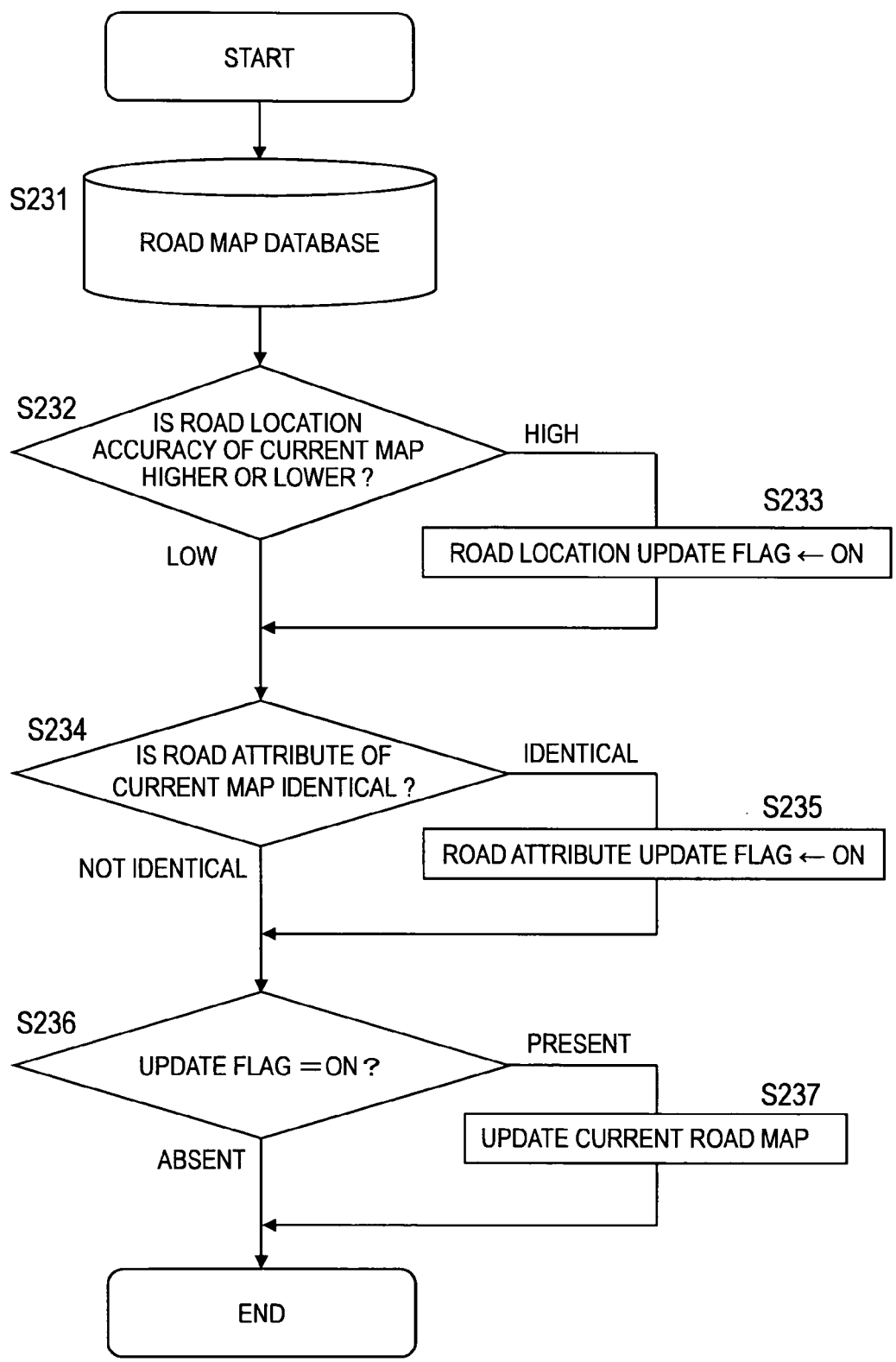
FIG. 9 is a flowchart of the road map reverse updating process in accordance with the embodiment of this invention.

FIG. 9 is a flowchart of the road map reverse updating process according to the embodiment of this invention. The road map reverse updating process is executed by the road map reverse updating unit 140.

First, the road map data stored in the current road map database is extracted (S231). Then, the accuracy of the extracted current road map data and that of the generated map object are compared with each other (S232). If the accuracy (for example, a variance) of the generated map object is higher than that of the current road map data as a result of the comparison, the generated map data has geometrically high accuracy. Therefore, the map database is determined to be required to be updated. Accordingly, a road location update flag is set ON (S233).

Thereafter, it is determined whether or not attributes of the generated map object (for example, including a lane node-link, a width of the lane, a direction of the lane, and the curvature of the lane, and the like) are identical with those of the current road map data (S234). As a result, when the attributes of the generated map object are identical with those of the extracted road map data, the generated map object may be written over the map database because the generated map data and the extracted road map data are data of the same target (road). Therefore, a road attribute update flag is set ON (S235).

Thereafter, it is determined whether or not the update flags are ON (S236). If both the road location update flag and the road attribute update flag are set ON, the generated map object and road attributes are written into the road map data to update the road map database (S237).

Figure 10:
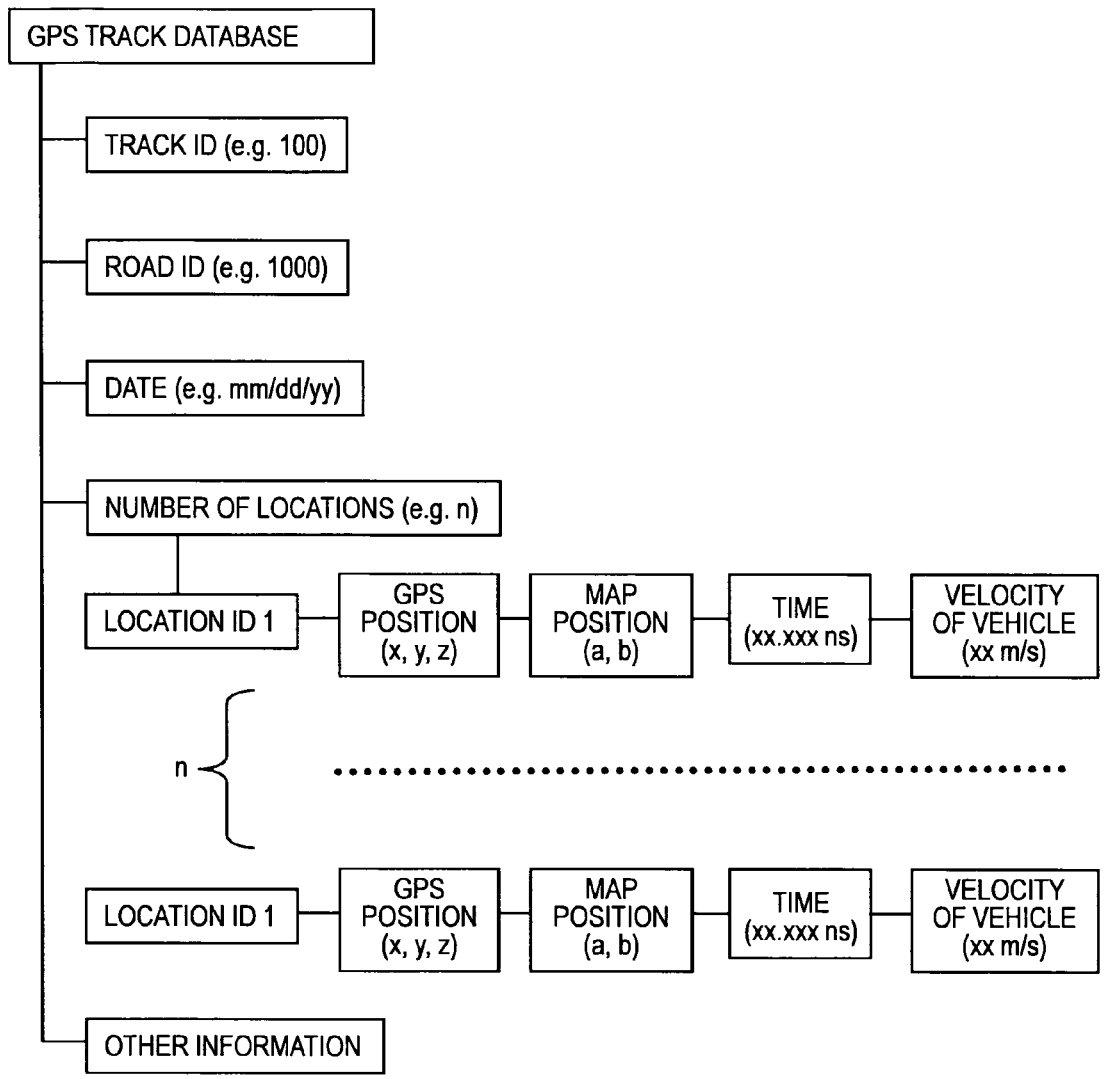
FIG. 10 is an explanatory diagram showing configuration of the GPS track data in accordance with the embodiment of this invention.

FIG. 10 is an explanatory diagram showing a configuration of the GPS track data according to the embodiment of this invention.

In this invention, the GPS track data plays an important role as a basic data source, and contains a track ID, a date, location information, and other information.

The track ID is a unique identifier of track data. The road ID is a unique identifier of a road on which the vehicle which has obtained the track data is traveling. The date indicates a date (year/month/day) of the acquisition of the track data. All the nodes (GPS positioning data) contained in the track data are combined by a link defining the number of nodes and a node sequence. Each node (GPS positioning data) contains a GPS position acquired by the GPS signal, the corresponding position on the map based on the result of matching the GPS position with the map, an acquisition time of the location information, and a velocity of the vehicle at the time of acquisition of the location information.

Figure 12:
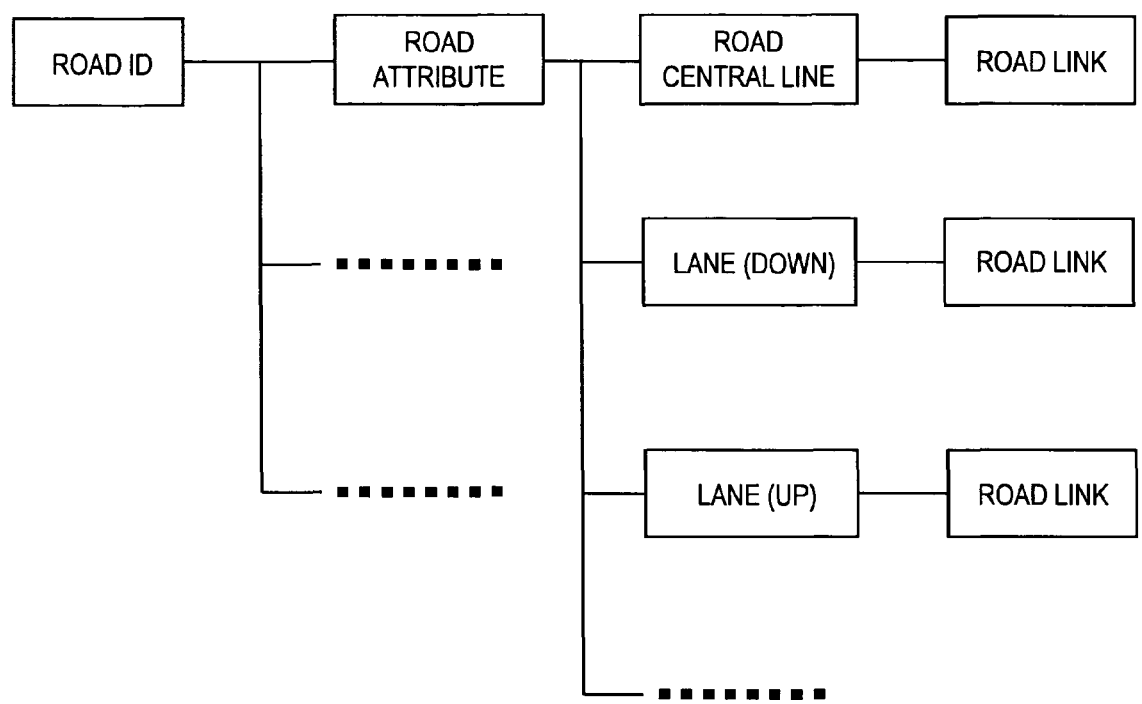

FIGS. 11 and 12 are explanatory diagram showing a configuration of enhanced road map data according to the embodiment of this invention. FIG. 11 illustrates data items, whereas FIG. 12 illustrates a data hierarchical structure.

In the current digital road map data structure, the road is constituted by a link of the nodes on the road central lines. The node link represents the geometric features of the road. The road map data structure contains the road ID, the number of lanes, and other road features as information representing the road.

The lane is constituted by the link of nodes on the lane central lines. The node link represents the geometric features of the lane. For example, a curvature of the lane is represented by a link of three nodes. Moreover, the road map data structure contains the lane ID, the direction of the lane (up or down) as information representing the lane. Further, as additional information, the information representing the lane may contain the width of the lane.

As illustrated in FIG. 12, the road map data used in the road map generation system according to the embodiment of this invention is hierarchized. The road attribute is linked with the road ID. Road central line data, lane (up) data, and lane (down) data are linked with the road attribute. The road attribute is a collective designation of data in the data items illustrated in FIG. 11 other than the road ID, the road central line data, the lane (up) data, and the lane (down) data.

Figure 13A:
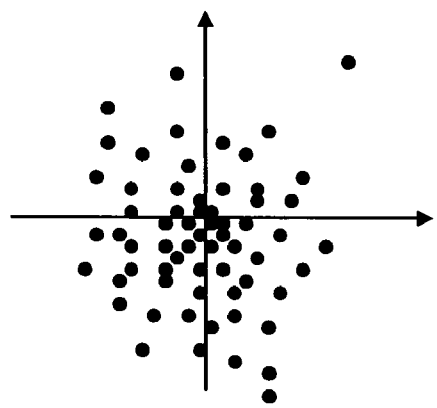
FIGS. 13A and 13B are distribution diagrams showing distribution of the GPS measurement data obtained by the road map generation system in accordance with the embodiment of this invention.

FIG. 13A illustrates the distribution of the GPS measurement data obtained by the road map generation system according to the embodiment of this invention.

Figure 13B:
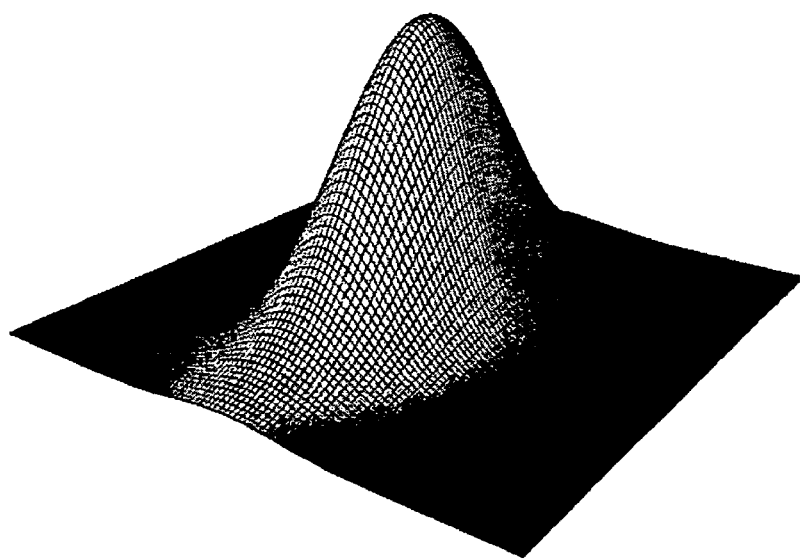

The location information provided by the GPS system contains a certain degree of error. Due to the uncertainness of the GPS system, the pieces of location data obtained by the GPS system distribute in the vicinity of the real location according to the Gaussian distribution (FIG. 13B). As a result, a symmetric two-dimensional Gaussian distribution centered at the origin is obtained. The use of a mean value of a large number of pieces of data on the Gaussian distribution allows a correct representation of the actual location. This is the fundamental idea of this invention.

FIG. 14 illustrates an example of the GPS track obtained by the road map generation system according to the embodiment of this invention.

When the vehicle travels on a road, the acquired GPS positioning data is recorded as a node at predetermined timing (for example, periodic or random time intervals). Thereafter, the recorded nodes are linked to form the GPS track. Specifically, each GPS track is generated from a vehicle trajectory.

Figure 15:
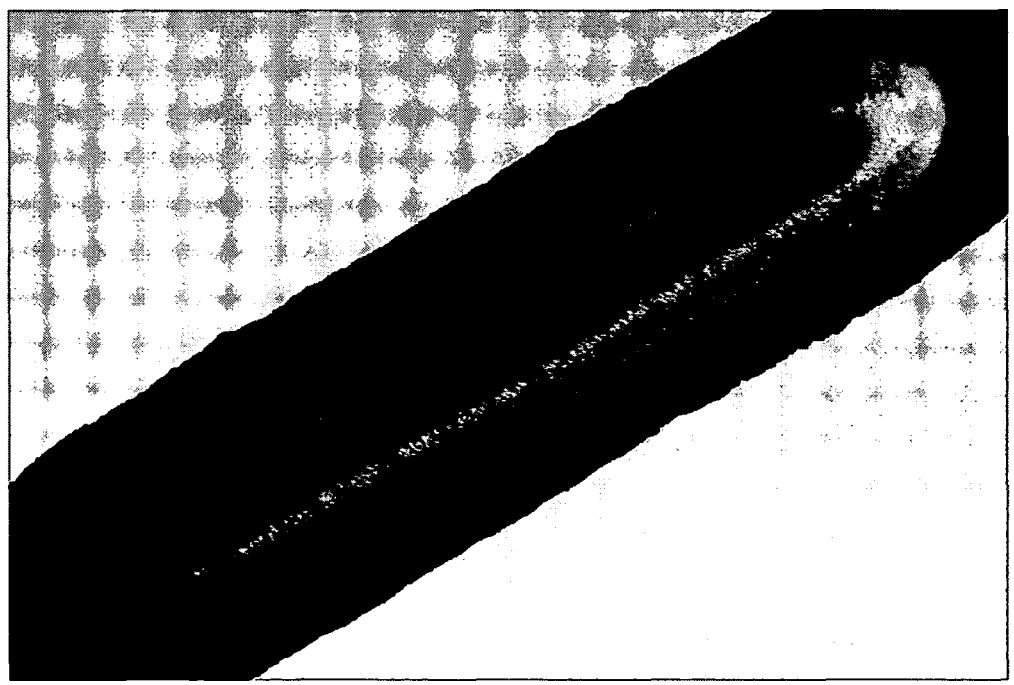

A plurality of pieces of the thus obtained GPS track data demonstrates a two-dimensional Gaussian distribution as illustrated in FIG. 15.

Figure 16A:
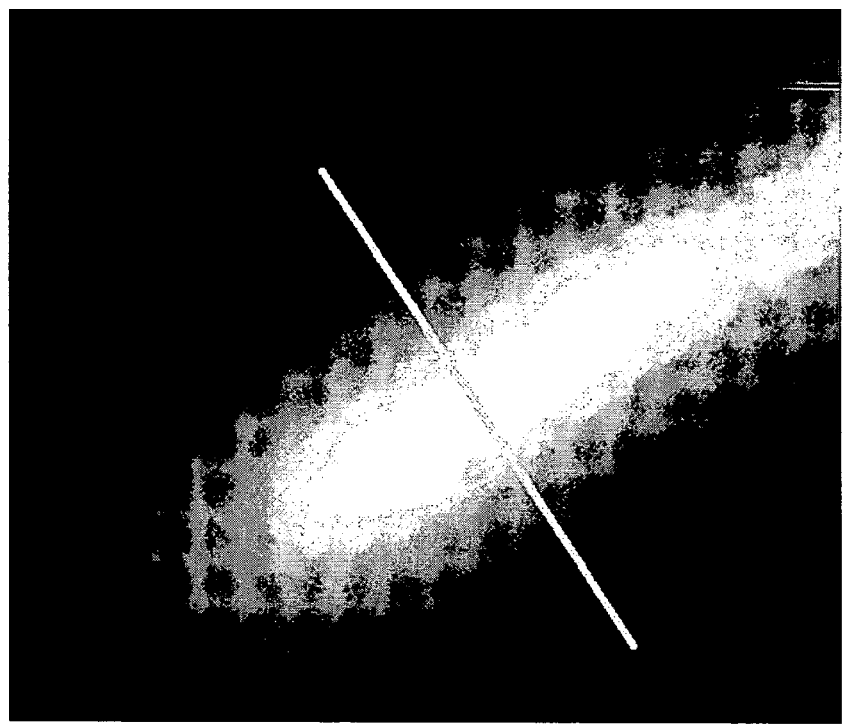
FIGS. 16A and 16B are explanatory diagrams showing profiles of the GPS track data obtained by the road map generation system in accordance with the embodiment of this invention.
Figure 16B:
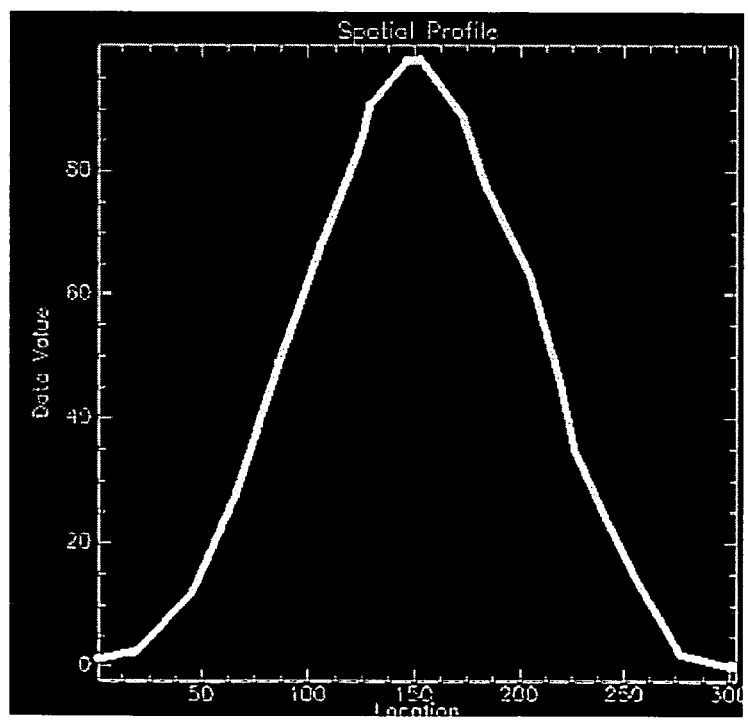

FIGS. 16A and 16B illustrate a profile of the GPS track data obtained by the road map generation system according to the embodiment of this invention, which is cut along a transversal line. Specifically, when the transversal line indicated by a solid line in FIG. 16A is taken as the abscissa axis, the plurality of pieces of the acquired GPS location data demonstrates a two-dimensional Gaussian distribution illustrated in FIG. 16B. A ridge point (feature point of the profile indicated by the mode) corresponds to a mean value of the GPS position data on the transversal line in the two-dimensional Gaussian distribution illustrated in FIG. 16B. The ridge point indicates the position of a center point of a lane in a segment indicated by the transversal line.

Figure 17:
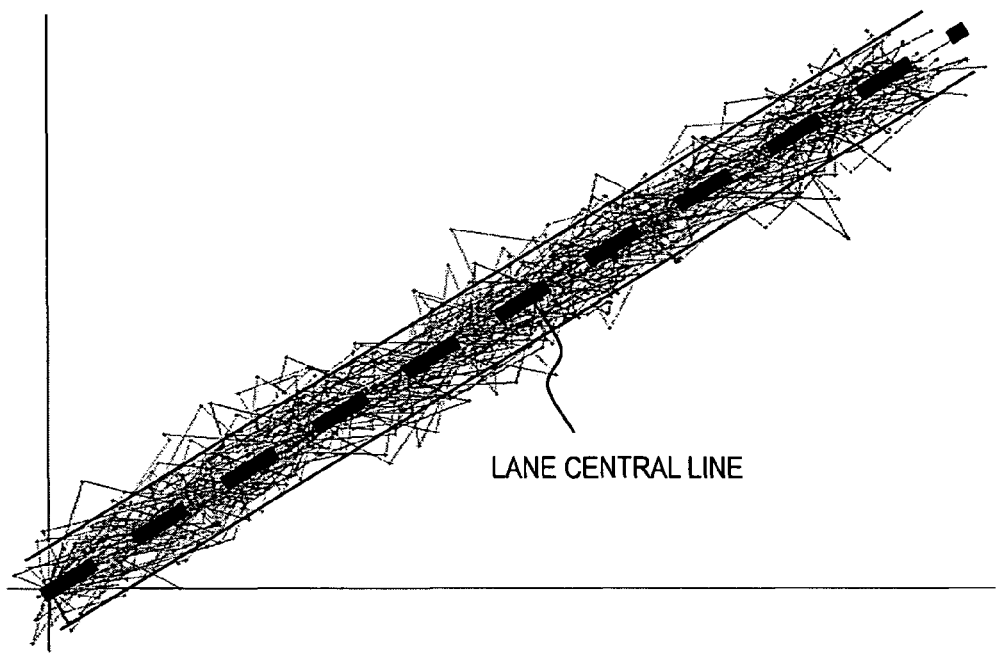
FIG. 17 is an explanatory diagram showing a lane central line obtained by the road map generation system in accordance with the embodiment of this invention.

FIG. 17 indicates a lane central line obtained by the road map generation system according to the embodiment of this invention. The ridge points of the segments indicated by the transversal lines set at predetermined intervals on the road are first calculated by using the least square method. Thereafter, a Spline curve satisfying the ridge points (for example, passing through the ridge points) is determined to be a lane central line. The intervals for setting the transversal lines may be fixed or may be varied depending on the road shape (for example, the interval may be set long in a straight segment, whereas the interval may be set short in a curve segment).

Figure 18:
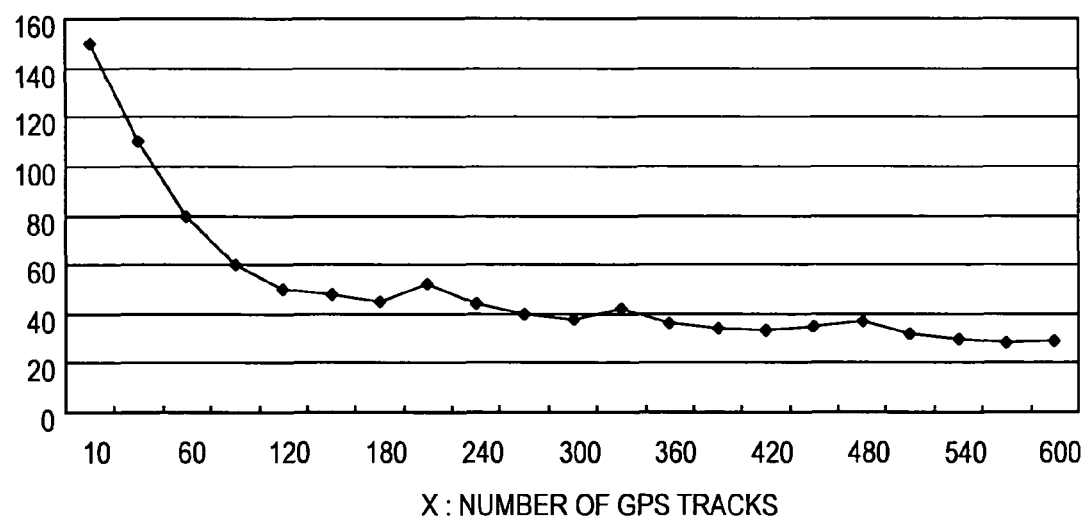
FIG. 18 is an explanatory diagram showing the relation between the number of pieces of GPS track data and an error of the extracted central line in the road map generation system in accordance with the embodiment of this invention.

FIG. 18 illustrates the relation between the number of pieces of GPS track data and an error of the extracted central line in the road map generation system according to the embodiment of this invention. As illustrated in FIG. 18, as the number of pieces of GPS track data increases, an error of the extracted central line becomes smaller to converge the central line. If the number of pieces of GPS track data is a predetermined number or more, the position of the extracted central line scarcely varies to be close to the position of the actual central line.

Figure 19:
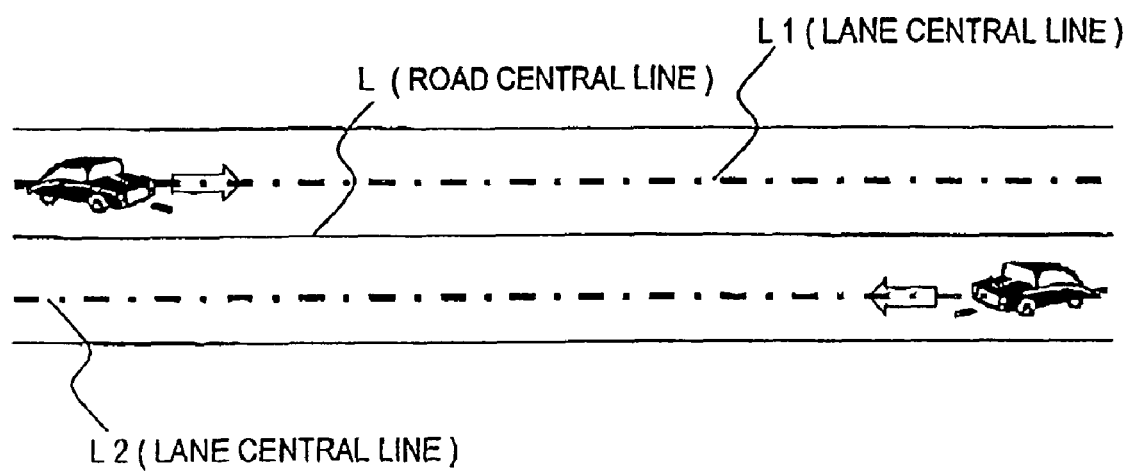
FIG. 19 is an explanatory diagram showing an example of the central line obtained by the road map generation system in accordance with the embodiment of this invention.

The lane central lines L1, L2 extracted with an error of a predetermined value or less as described above is added to the enhanced digital road map with a road central line L as illustrated in FIG. 19 to contribute to the improvement of driving safety.

Although the example with the use of the GPS signal has been described above as an embodiment of this invention, this invention is not limited thereto and is also applicable to various other positioning methods in a similar manner. Therefore, other positioning methods are encompassed in the scope of this invention.

Next, the effects of this invention will be described.

FIG. 20 illustrates the comparison between conventional mapping technologies and this invention. The conventional road map generation technologies include a manual ground-based survey, a probe-car survey, and an air survey. Each of these technologies has advantages as well as disadvantages in various applications. However, up to now, any of the survey technologies does not satisfy the requirements for generating a highly accurate road map and has problems in its application in a technical point of view and/or an economical point of view. Meanwhile, the method according to this invention is extremely promising especially for the generation of a navigation map.

The map reverse updating technology according to this invention does not only propose a new approach of map update but also has various advantages over the conventional map generation methods even as a new method of generating the road map. In particular, the method according to this invention is extremely suitable for generating the navigation road map.

For example, even today, a method of extracting road information from image data (pictures) obtained by remote sensing is extremely popular. However, since the identity of a data source (for example, a road on the picture) with the generated road map is little noticed, a difference between the generated road map and the actual road is neglected, which induces a problem in accuracy as well as in reliability of the map. The generation of the map by using a plurality of methods at a time (co-registration) is laborious and costly, and also requires careful control for using the plurality of methods at a time. Further, the image data is unbiased information obtained over a broad range, which imposes a severe problem on an image analysis system which specifies a road from the complex image data. A mobile mapping technology also has problems in feature extraction and geo-referencing. Moreover, its local coverage limits the applicable filed of the mobile mapping technology.

The reverse updating technology according to this invention exploits an extremely unique data source, which is the GPS track obtained by a vehicle motion, excluding the use of information obtained by any of other survey methods. The idea of the reverse updating technology is based on the common awareness that almost all the drivers drive on the central line of the lane in reality. Therefore, the GPS track data not only reflects the driver's behavior but also depends on the road information. The road map generated by the method of this invention faithfully depicts a state of the actual road, and therefore, has high reliability for driving guidance and assistance. Further, according to this invention, even a road under a bridge, in a tunnel, or in a building can be mapped, which is far beyond the capability of the conventional technologies.

The map reverse updating method according to this invention is highly cost-effective with great potential applications. For example, a data source acquired by a conventional measurement technology is costly as in the case of the image data obtained by remote sensing and accurate measurement data obtained by the mobile mapping technology. Contrary to the data sources as described above, according to the map reverse updating method of this invention, the data recycling using the GPS track data allows the road information to be acquired at a low cost. A method of extracting the road information from massive GPS track data can be automatically calculated by using a statistic method. Therefore, according to the map reverse updating method of this invention, the feature extraction step, the map generation step, and the map updating step can be smoothly integrated.

Moreover, the map reverse updating system functions in an independent data processing center for the road mapping propose or as a complementary system for the existing map update system. As a result, the performance of the system for generating and updating the road map can be remarkably improved while reducing the total cost of the system.

The method of generating a highly accurate map based on the collected GPS data has been described above. On the other hand, the data of the lane central line generated by the map generation system according to this embodiment can be corrected by means such as the reference position correction unit 150 illustrated in FIG. 3.

Figure 21A:
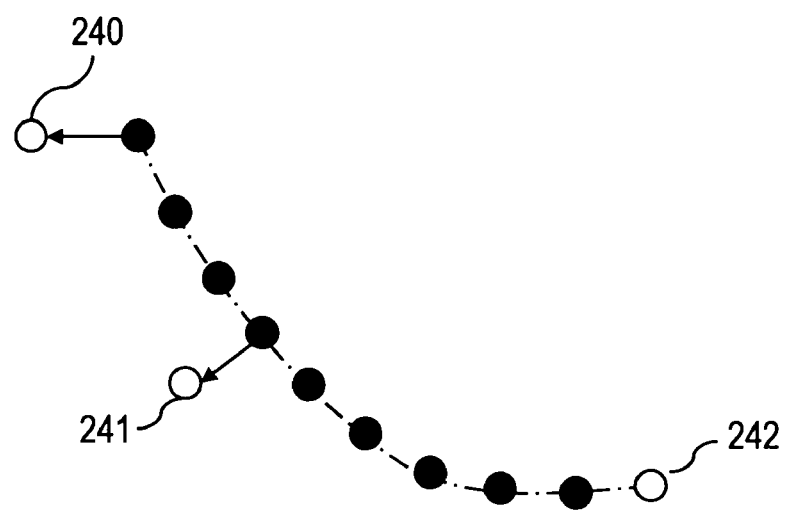
FIGS. 21A and 21B are explanatory diagrams showing examples of correction of the central line in accordance with the embodiment of this invention.
Figure 21B:
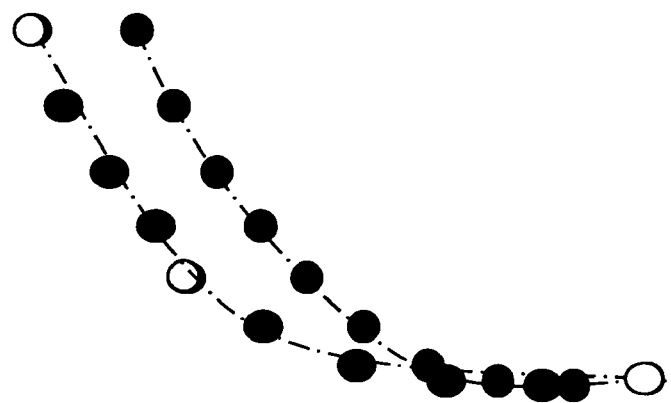
Figure 23:
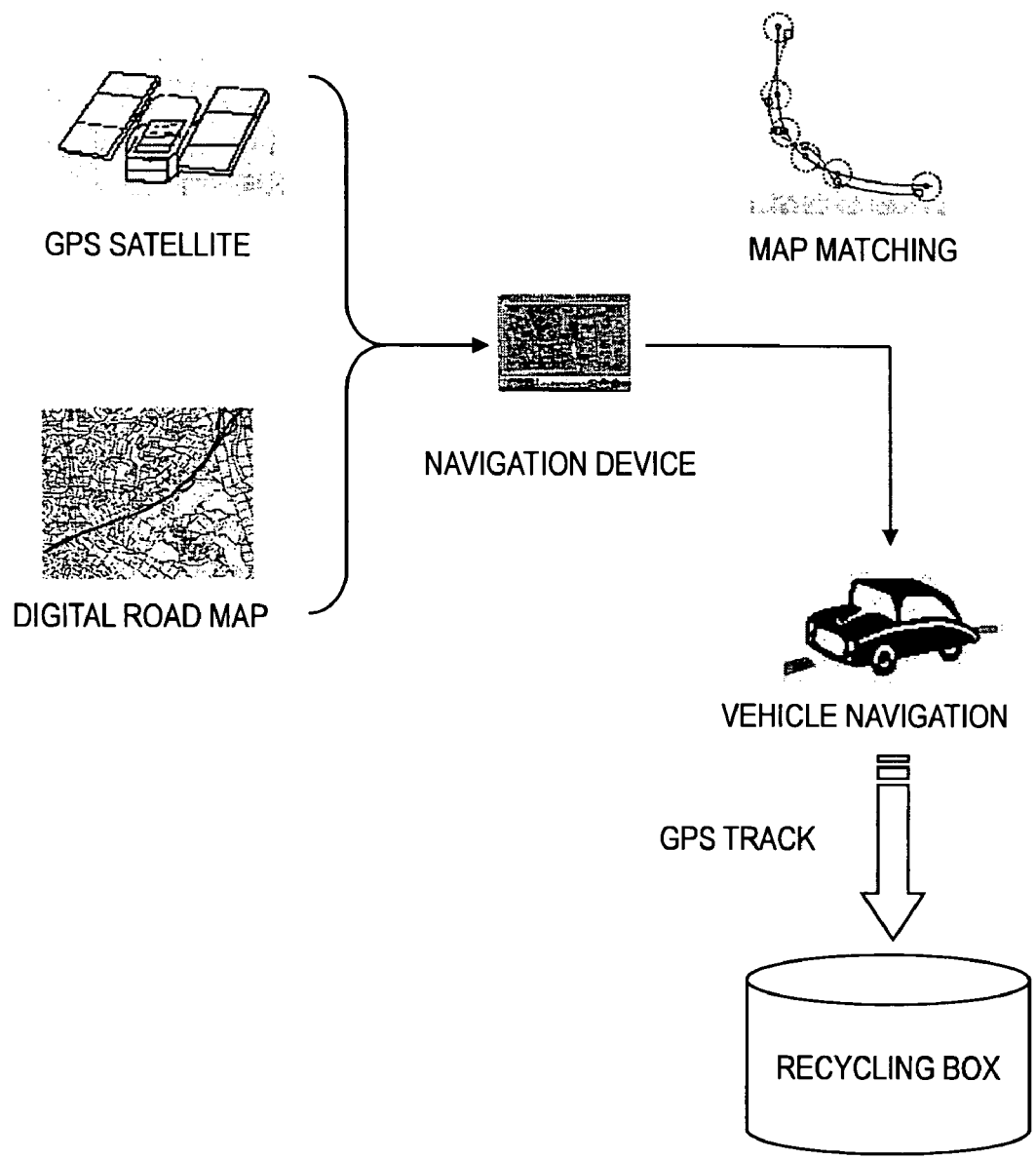
FIGS. 23 to 25 are explanatory diagrams showing a conventional vehicle navigation system.
Figure 24:
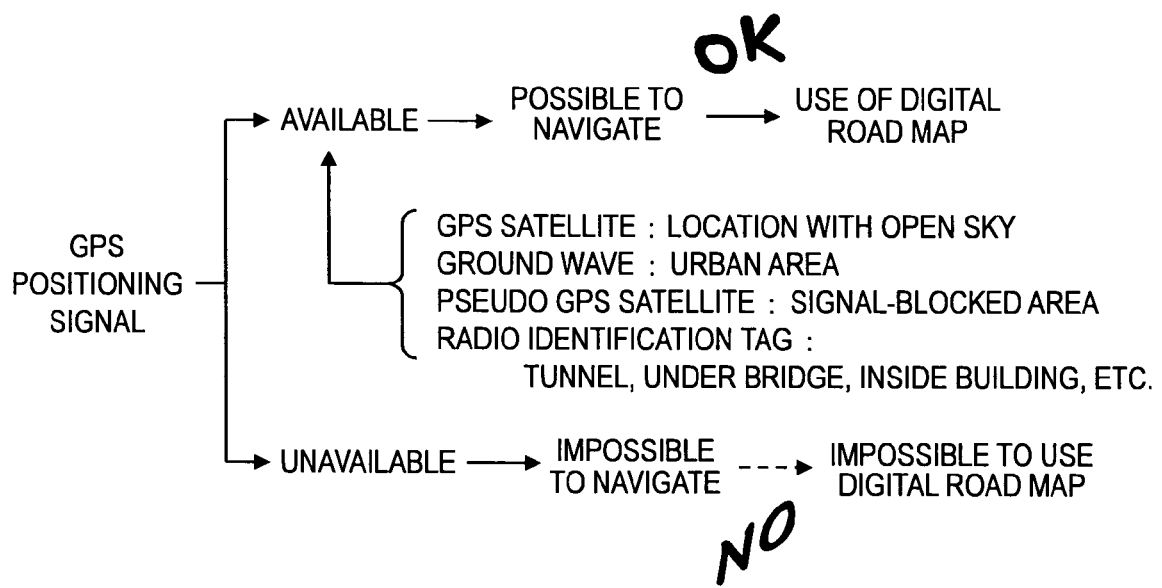
Figure 25:
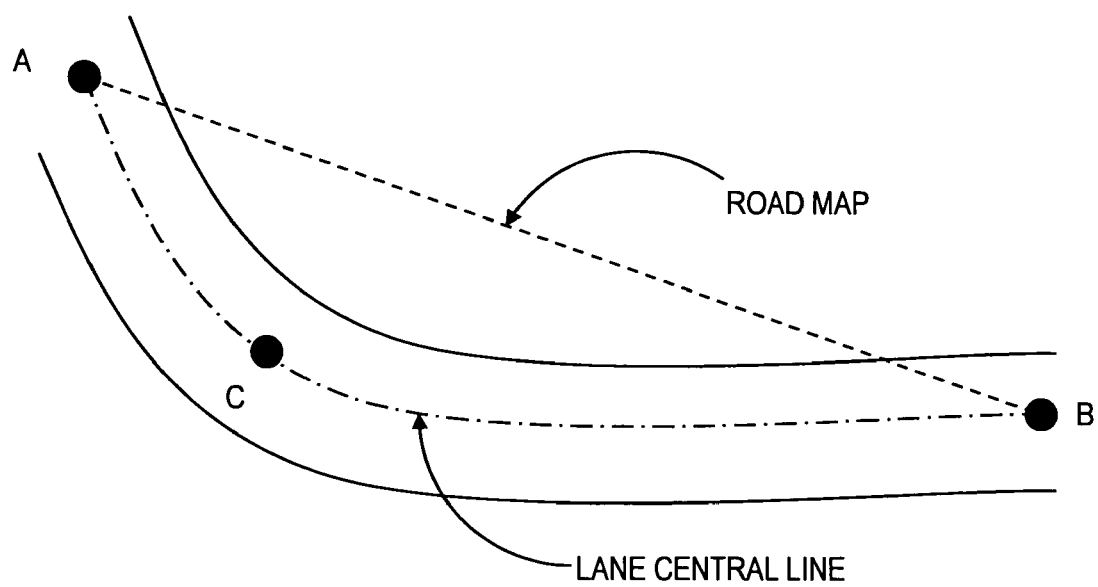

For example, the map generation system according to this embodiment generates a lane central line as illustrated in FIGS. 21A and 21B. Each black circle indicates a point on the lane central line, which corresponds to each of the position $(X1, Y1)$, $(X2, Y2)$ ... on the "lane central line" of FIG. 11. Further, it is assumed that a coordinate of a point (reference position) indicated by a white circle 240, 241, or 242 on the lane central line, which is precisely measured by another means, is obtained. Normally, the precise measurement requires manpower and costly measurement equipment. Therefore, only a smaller number of reference positions is available as compared with the number of the points $(X1, Y1)$, $(X2, Y2)$ ... on the lane central line generated by this invention.

Thus, a large number of points on the lane central line are corrected based on a smaller number of reference positions by a process illustrated in FIG. 22. First, for each reference position, the closest point (reference position neighboring point) is extracted from the lane central line before the correction (S2501). Next, for each reference position, a difference (difference vector) between a position vector of the reference position and that of the reference position neighboring point is calculated (S2502).

Next, for each point $(Xsi, Ysi)$ on the lane central line before the correction, the following process (S2502 to S2505) is repeated. First, two reference position neighboring points $(Xsi1, Ysi1)$ and $(Xsi2, Ysi2)$, which are the closest to the point $(Xsi, Ysi)$, are obtained (S2503). Next, a correction vector for each point on the lane central line is obtained. Specifically, a difference vector of each of $(Xsi1, Ysi1)$ and $(Xsi2, Ysi2)$ is internally divided according to a distance from each of the two reference position neighboring points to obtain a correction vector (S2504). Finally, the obtained correction vector is used to correct the lane central line (S2505).

Alternatively, the lane central line may be corrected only when the accuracy of the reference position is input to the reference position correction unit 150 and the input accuracy of the reference position exceeds an estimated accuracy of the lane central line obtained by this embodiment. In this case, for example, a standard deviation value of the GPS data may be used as the estimated accuracy of the lane central line.

The above description is summarized as follows. According to the method of generating the road map in the embodiment of this invention, the collection of a large number of pieces of GPS data acquired by a vehicle motion, the accumulation of the collected GPS data, and the analysis of the accumulated GPS data dynamically generate an extremely cost-effective and highly accurate road map.

Moreover, according to the method of generating the road map in the embodiment of this invention, the generated road map is extracted by modeling an actual vehicle motion. Thereafter, the geometrical features of the road are extremely precisely exhibited. According to the embodiment of this invention, the economical, effective, and functional system for quickly generating the enhanced digital road map can be realized to satisfy the requirements for using the map in the driving safety application.

What is claimed is:

1. A non-transitory computer-usable storage medium having computer readable instructions stored thereon for execution by a processor to perform a method of generating a digital road map, the method comprising:
using a least square method to extract feature points from a collected plurality of pieces of track data that are captured based on vehicle movement along a road and each include positional data;
determining a lane central line of a lane along the road by calculating a Spline curve satisfying the extracted feature points;
determining whether to update current map data of the digital road map based on a comparison of the number of pieces of track data with a predetermined threshold value and
in response to a determination to update the current map data of the digital road map based on the comparison, writing a new map object for the road corresponding to the determined lane central line to the current map data of the digital road map to form updated map data.

2. The non-transitory computer-usable storage medium according to claim 1, further comprising:
capturing the plurality of pieces of track data by acquiring location data of the vehicle obtained over time by a GPS device as the positional data and collecting the captured plurality of pieces of track data to generate a database;
partitioning the road to be updated into a plurality of segments, interpolating the collected plurality of pieces of track data into each of the plurality of segments of the road obtained by the partition, extracting the feature points from the plurality of pieces of track data by using the least square method for each of the plurality of segments, and calculating the Spline curve passing through the extracted feature points as a candidate of a road central line of the road; and
updating, when an error of the Spline curve calculated as the candidate is sufficiently converged according to a predetermined threshold value, the current map data by writing the new map object corresponding to the Spline curve calculated as the candidate to form the updated map data.

3. The non-transitory computer-usable storage medium according to claim 2, wherein:
a process of acquiring the location data of the vehicle can be selected any one of a first mode, a second mode, and a third mode; wherein:
in the first mode, an operator of the vehicle can set whether the location data is recorded;
in the second mode, the location data is not recorded when there is no more recording capacity for the location data; and
in the third mode, the location data is recorded when an external signal is received.

4. The non-transitory computer-usable storage medium according to claim 3, further comprising:
recording the location data including a location of the vehicle obtained by the GPS device, a data acquisition time, an identifier of a road on which the vehicle is present, and a velocity and a running direction of the vehicle when the location data is controlled to be recorded;
generating data for recording the recorded location data in association with a road on the map; and
linking the generated data for recording in order of acquisition time of the location data to be stored as track data in a track database.

5. The non-transitory computer-usable storage medium according to claim 2, further comprising:
receiving an input of the location data of the vehicle;
verifying validity of the input location data;
generating track data corresponding to an identifier of a road on which the vehicle is present when the input location data is valid; and
storing the generated track data.

6. The non-transitory computer-usable storage medium according to claim 2, further comprising:
determining that a setting indicates a necessity of update of the current map data of the road from which the plurality of pieces of track data are collected;
specifying the track data used for update based on an identifier of the road determined as being required to be updated and a date and a time of acquisition of each of the plurality of pieces of track data;
interpolating the specified track data into each of the plurality of segments obtained by partitioning the road;
extracting a ridge point from the specified track data by using the least square method for each of the plurality of segments; and
calculating the Spline curve passing through the extracted ridge point as the candidate of the road central line.

7. The non-transitory computer-usable storage medium according to claim 6, further comprising:
comparing an error of the track data used for update with a predetermined threshold value; and
interpolating the specified track data into each of the plurality of segments obtained by partitioning the road when it is judged that the error is converged.

8. The non-transitory computer-usable storage medium according to claim 6, further comprising:
interpolating the specified track data into each of the plurality of segments obtained by partitioning the road upon determining to update the current map data of the digital road map based on the comparison of the quantity of the pieces of track data with the predetermined threshold.

9. The non-transitory computer-usable storage medium according to claim 2, further comprising:
determining whether the calculated Spline curve is sufficiently converged according to the predetermined threshold value and further comparing an attribute of the calculated Spline curve and an attribute of a current lane central line of the current map data with each other; and
updating the current map data by writing the new map object corresponding to the calculated Spline curve when accuracy of the calculated Spline curve is higher than accuracy of the current lane central line and the attribute of the calculated Spline curve and the attribute of the current line central line are identical with each other.

10. The non-transitory computer-usable storage medium according to claim 9, wherein the attribute of the calculated Spline curve includes a lane node-link, a width of the lane, and a curvature of the lane.

11. The non-transitory computer-usable storage medium according to claim 1, further comprising correcting the lane central line by referring to a set of reference positions stored in a road map database.

12. The non-transitory computer-usable storage medium according to claim 11, further comprising:

extracting a nearest neighboring point for each of the reference positions from points on the lane central line before correction;

obtaining a difference between each of the reference positions and the nearest neighboring point; and obtaining a correction vector of each of the points on the lane central line according to a distance from each of two nearest neighboring points.

13. A map generation system comprising:

a mobile device set in a vehicle for acquiring location data of a vehicle obtained by a GPS system and a status of the vehicle at a time of acquisition of the location data; and a server for processing the acquired location data of the vehicle, the location data being used to generate a digital road map, wherein the server comprises:

an input interface for receiving the location data of the vehicle;

a first storage unit for storing the received location data;

a processor for generating a GPS track from the received location data to generate a map object from the generated GPS track; and a second storage unit for storing a map database, and wherein the processor is configured, by executing a predetermined computer program, to implement:

an extraction unit for using a least square method to extract feature points from a collected plurality of pieces of track data that are captured based on vehicle movement along a road and each include positional data and determining a lane central line of a lane along the road by calculating a Spline curve satisfying the extracted feature points; and an update unit for determining whether to update current map data of the digital road map based on a comparison of the number of pieces of track data with a predetermined threshold value and, in response to a determination to update the current map data of the digital road map based on the comparison, writing a new map object for the road corresponding to the determined lane central line to the current map data of the digital road map to form updated map data.

14. The map generation system according to claim 13, wherein:

the processor is further configured to implement a management unit for capturing the plurality of pieces of track data by acquiring location data of the vehicle obtained over time by a GPS system as the positional data and collecting the captured plurality of pieces of track data to generate a database;

the extraction unit is configured to partition the road to be updated into a plurality of segments, interpolate the collected plurality of pieces of track data into each of the plurality of segments of the road obtained by the partition, extract the feature points from the plurality of pieces of track data by using the least square method for each of the plurality of segments, and calculate the Spline curve passing through the extracted feature points as a candidate of a road central line of the road; and the update unit is configured to update the current map data by writing the new map object corresponding to the Spline curve calculated as the candidate when an error of the Spline curve calculated as the candidate is sufficiently converged according to a predetermined threshold value.

15. The map generation system according to claim 14, wherein:

the mobile device comprises a GPS receiver for measuring a location of the vehicle;

a location data recording unit for recording location data measured by the GPS receiver; and an output interface for transmitting the recorded location data;

the location data recording unit is configured to be set to operate in any one of a first mode, a second mode, and a third mode as a method of acquiring the location data of the vehicle; wherein:

in the first mode, an operator of the vehicle can set whether the location data is recorded in the location data recording unit;

in the second mode, the location data is not recorded in the location data recording unit when there is no more recording capacity for the location data; and in the third mode, the location data is recorded in the location data recording unit when an external signal is received.

16. The map generation system according to claim 15, wherein the location data recording unit is configured to:

record the location data including a location of the vehicle obtained by the GPS receiver, a data acquisition time, an identifier of a road on which the vehicle is present, and a velocity and a running direction of the vehicle when the location data recording unit is controlled to record the location data;

generate data for recording the recorded location data in association with a road on the map; and link the generated data for recording in order of acquisition time of the location data to be stored as track data in a track database.

17. The map generation system according to claim 14, wherein the management unit is configured to:

receive an input of the location data of the vehicle;

verify validity of the input location data;

generate track data corresponding to an identifier of a road on which the vehicle is present when the input location data is determined as valid; and store the generated track data.

18. The map generation system according to claim 14, wherein the extraction unit is configured to:

determine that a setting indicates a necessity of update of the current map data of the road from which the plurality of pieces of track data are collected;

determining that a setting indicates a necessity;

specify the track data used for update based on an identifier of the road determined as being required to be updated and a date and a time of acquisition of each of the plurality of pieces of track data;

interpolate the specified track data into each of the plurality of segments obtained by partitioning the road;

extract a ridge point from the track data by using the least square method for each of the plurality of segments; and calculate the Spline curve passing through the extracted ridge point as the candidate of the road central line.

19. The map generation system according to claim 18, wherein the extraction unit is configured to:

compare an error of the track data used for update with a predetermined threshold value; and interpolate the specified track data into each of the plurality of segments obtained by partitioning the road when it is judged that the error is converged.

20. The map generation system according to claim 18, wherein the extraction unit is configured to:

interpolate the specified track data into each of the plurality of segments obtained by partitioning the road upon determining to update the current map data of the digital road map based on the comparison of the quantity of the pieces of track data with the predetermined threshold.

21. The map generation system according to claim 14, wherein the update unit is configured to:
   determine whether the calculated Spline curve is sufficiently converged according to the predetermined threshold value and further compare an attribute of the calculated Spline curve and an attribute of a current lane central line of the current map data with each other; and
   update the current map data by writing the new map object corresponding to the calculated Spline curve when accuracy of the calculated Spline curve is higher than accuracy of the current lane central line and the attribute of the calculated Spline curve and the attribute of the current line central line are identical with each other.

22. The map generation system according to claim 21, wherein the attribute of the calculated Spline curve includes a lane node-link, a width of the lane, and a curvature of the lane.

23. The map generation system according to claim 13, further comprising a lane central line correction unit for correcting the lane central line by referring to a set of reference positions stored in the map database.

24. The map generation system according to claim 23, wherein the lane central line correction unit is configured to:
   extract a nearest neighboring point for each of the reference positions from points on the lane central line before correction;
   obtain a difference between each of the reference positions and the nearest neighboring point; and
   obtain a correction vector of each of the points on the lane central line according to a distance from each of the two nearest neighboring points.

* * * * *